(12) United States Patent
O'Riordan et al.

(10) Patent No.: US 12,360,777 B2
(45) Date of Patent: Jul. 15, 2025

(54) SYSTEMS AND METHODS FOR DYNAMICALLY CONFIGURING MULTIDIMENSIONAL DATA PROCESSING PIPELINES IN SOFTWARE-CONTROLLED HARDWARE-SOFTWARE EMBEDDED SYSTEMS

(71) Applicant: UBOTICA TECHNOLOGIES LIMITED, Dublin (IE)

(72) Inventors: Martin O'Riordan, Dublin (IE); Álvaro Guerrero del Pozo, Dublin (IE); Aubrey Dunne, Dublin (IE); Fintan Buckley, Dublin (IE)

(73) Assignee: UBOTICA TECHNOLOGIES LIMITED, Dublin (IE)

( * ) Notice: Subject to any disclaimer, the term of this patent is extended or adjusted under 35 U.S.C. 154(b) by 984 days.

(21) Appl. No.: 17/338,240

(22) Filed: Jun. 3, 2021

(65) Prior Publication Data
US 2021/0383258 A1      Dec. 9, 2021

Related U.S. Application Data

(60) Provisional application No. 63/034,040, filed on Jun. 3, 2020.

(51) Int. Cl.
*G06F 9/44* (2018.01)
*G06F 9/445* (2018.01)
*G06F 9/50* (2006.01)
*G06N 3/08* (2023.01)

(52) U.S. Cl.
CPC ........ *G06F 9/44505* (2013.01); *G06F 9/5066* (2013.01); *G06N 3/08* (2013.01); *G06F 2209/501* (2013.01)

(58) Field of Classification Search
CPC .............. G06F 9/44505; G06F 9/5066; G06F 2209/501; G06N 3/08
See application file for complete search history.

(56) References Cited

U.S. PATENT DOCUMENTS

| | | | | |
|---|---|---|---|---|
| 10,496,653 | B1* | 12/2019 | Epshteyn | G06F 16/24578 |
| 2018/0060744 | A1* | 3/2018 | Achin | G06N 20/00 |
| 2021/0089961 | A1* | 3/2021 | Zeise | G06N 20/00 |
| 2021/0342125 | A1* | 11/2021 | Burnett | G06F 8/34 |
| 2023/0169172 | A1* | 6/2023 | Edwards | G06F 8/654 726/21 |
| 2023/0289241 | A1* | 9/2023 | Gupta | G06F 9/4881 |

* cited by examiner

*Primary Examiner* — Zahid Choudhury
(74) *Attorney, Agent, or Firm* — The Marbury Law Group, PLLC

(57) ABSTRACT

Methods, devices and system for designing and deploying one or more data processing pipelines on an embedded system. These data processing pipelines may be deployed without requiring the application running on the embedded system to be rebuilt, redeployed, or halted.

20 Claims, 23 Drawing Sheets

SYSTEMS AND METHODS FOR DYNAMICALLY CONFIGURING MULTIDIMENSIONAL DATA PROCESSING PIPELINES IN SOFTWARE-CONTROLLED HARDWARE-SOFTWARE EMBEDDED SYSTEMS

RELATED APPLICATIONS

This application claims the benefit of priority to U.S. Provisional Application 63/034,040 entitled "Systems and Methods for Dynamically Configuring Multidimensional Data Processing Pipelines in Software-controlled Hardware-Software Embedded Systems" filed Jun. 3, 2020, the entire contents of which are hereby incorporated by reference for all purposes.

BACKGROUND

Many contemporary embedded systems are now capable of performing neural network inference within practicable power budgets, and consequently there is a proliferation of artificial intelligence (AI) driven embedded devices/applications that process multi-dimensional data at source to produce an actionable result. Many of these applications use convolutional neural networks and apply them to image data, where this image data may be acquired by the embedded processor directly from a connected image sensor.

It is a common trend with convolutional neural network architectures to use input layer (tensor) sizes that are significantly smaller than the raw size of the image captured at the sensor. Typically, this is in order to achieve higher frame throughput, as smaller input images imply less operations in the inference process and therefore a higher framerate or reduced power requirements.

In addition, the input image to a convolutional neural network may require pre-processing in order to ensure that the image matches the level of processing applied to the images that were used for training the network. Further, in order to achieve optimum inference results, the input image may benefit from several pre-processing steps that improve the image quality and fidelity. Such image signal processing steps may, for example, convert Bayer images into de-Bayered images, which are more representative of the images used for training most convolutional neural networks.

Embedded processors that perform convolutional neural network inference on image frames from a directly connected sensor thus often require an element of image signal processing prior to inference. The steps required within the image signal processing are sensor dependent, and may also be dependent on the environment and the convolutional neural network itself. The ability to tune such image signal processing to best match the expected input of the inference step is important in developing a system that performs optimally, and indeed may be essential to achieving operation in some deployments. For example, by enabling tuning of the image prior to inference, the use of a broader range of pre-trained convolutional neural network models is possible, since image signal processing modifications alone may accommodate for the variations in the image types expected at the input of different convolutional neural networks. This in turn may speed up development cycles, as existing convolutional neural network architecture and even existing trained models may be used, and it may not be required to re-train the network.

Sensor performance may also vary and degrade over the deployment lifetime of the sensor, and if these variations are not accounted for in an embedded system, then the system performance itself may degrade with time. As such, systems that allow life-cycle updates to a processor or processing pipeline to accommodate such changes or variations, without having to compile and deploy a new application, will be beneficial to developers and consumers of embedded devices.

SUMMARY

The various aspects include methods of dynamically configuring processing pipelines in software-controlled hardware-software embedded systems, including receiving, by a processor at a centralized site, a processing pipeline node characteristics file that defines nodes available in a specific hardware platform for executing steps in a processing pipeline, using, by the processor, the received processing pipeline node characteristics file to generate a processing pipeline configuration, in which the generated processing pipeline configuration includes a plurality of processing nodes, and each processing node in the plurality of processing nodes includes operational parameters and one or more connections to one or more of the plurality of processing nodes, validating, by the processor, the generated processing pipeline configuration, serializing, by the processor, the validated processing pipeline configuration to generate a processing pipeline configuration descriptor, and sending, by the processor, the generated processing pipeline configuration descriptor to an embedded device.

Some aspects may further include receiving, by the embedded device, the processing pipeline configuration descriptor sent from the centralized site, determining, by the embedded device, the processing pipeline configuration based on the received processing pipeline configuration descriptor, extracting, by the embedded device, the plurality of processing nodes, operational parameters, and connections from the determined processing pipeline configuration, constructing, by the embedded device, a local processing pipeline based on the extracted plurality of processing nodes, operational parameters, and connections, and using, by the embedded device, the constructed local processing pipeline to process data.

In some aspects, using the constructed local processing pipeline to process the data includes using the constructed local processing pipeline to process at least one or more of: an input image frame, an input audio frame, an input radar frame, or an input hyperspectral data cube.

Some aspects may further include collecting, by the embedded device, sensor data from a sensor of the embedded device, determining, by the embedded device, whether a difference between the collected sensor data and expected sensor data exceeds a threshold value, modifying, by the embedded device, the local processing pipeline to include different operational parameters or connections between nodes in response to determining that the difference between the collected sensor data and the expected sensor data exceeds the threshold value, and using, by the embedded device, the modified local processing pipeline to process the data.

Some aspects may further include generating, by the processor, an updated processing pipeline configuration based on the processing pipeline node characteristics file, in which the generated updated processing pipeline configuration includes a different plurality of processing nodes or a different configuration for one or more of the processing nodes, updating, by the processor, operational parameters of the different plurality of processing nodes included in the updated processing pipeline configuration, validating, by the processor, the updated processing pipeline configuration, serializing, by the processor, the validated updated processing pipeline configuration to generate a second processing pipeline configuration descriptor, and sending, by the processor, the generated second processing pipeline configuration descriptor to the embedded device.

Some aspects may further include receiving, by the embedded device, the second processing pipeline configuration descriptor sent from the centralized site, determining, by the embedded device, an updated processing pipeline configuration based on the received processing pipeline configuration descriptor, extracting, by the embedded device, the plurality of processing nodes, operational parameters, and connections from the determined updated processing pipeline configuration, constructing, by the embedded device, a second local processing pipeline based on the extracted plurality of processing nodes, operational parameters, and connections, and using, by the embedded device, the constructed second local processing pipeline to process the data. In some aspects, using the constructed second local processing pipeline to process the data includes repurposing the embedded device a different purpose, task or mission.

In some aspects, sending the generated processing pipeline configuration descriptor to the embedded device causes the embedded device to modify operations of one or more nodes in a local processing pipeline of the embedded device. In some aspects, sending the generated processing pipeline configuration descriptor to the embedded device causes the embedded device to modify a local processing pipeline while continuing to process the data. In some aspects, receiving the pipeline node characteristics includes receiving a comma separated value (CSV) delimited file containing data representing the processing nodes supported by an embedded system and parameter descriptions for each processing node.

Further aspects may include a computing device (e.g., computing device at a centralized site, an embedded device, etc.) having a processor configured with processor-executable instructions to perform various operations corresponding to the methods discussed above.

Further aspects may include a non-transitory processor-readable storage medium having stored thereon processor-executable instructions configured to cause a processor to perform various operations corresponding to the method operations discussed above.

Further aspects may include a computing device having various means for performing functions corresponding to the method operations discussed above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DESCRIPTION

Figure 1A:
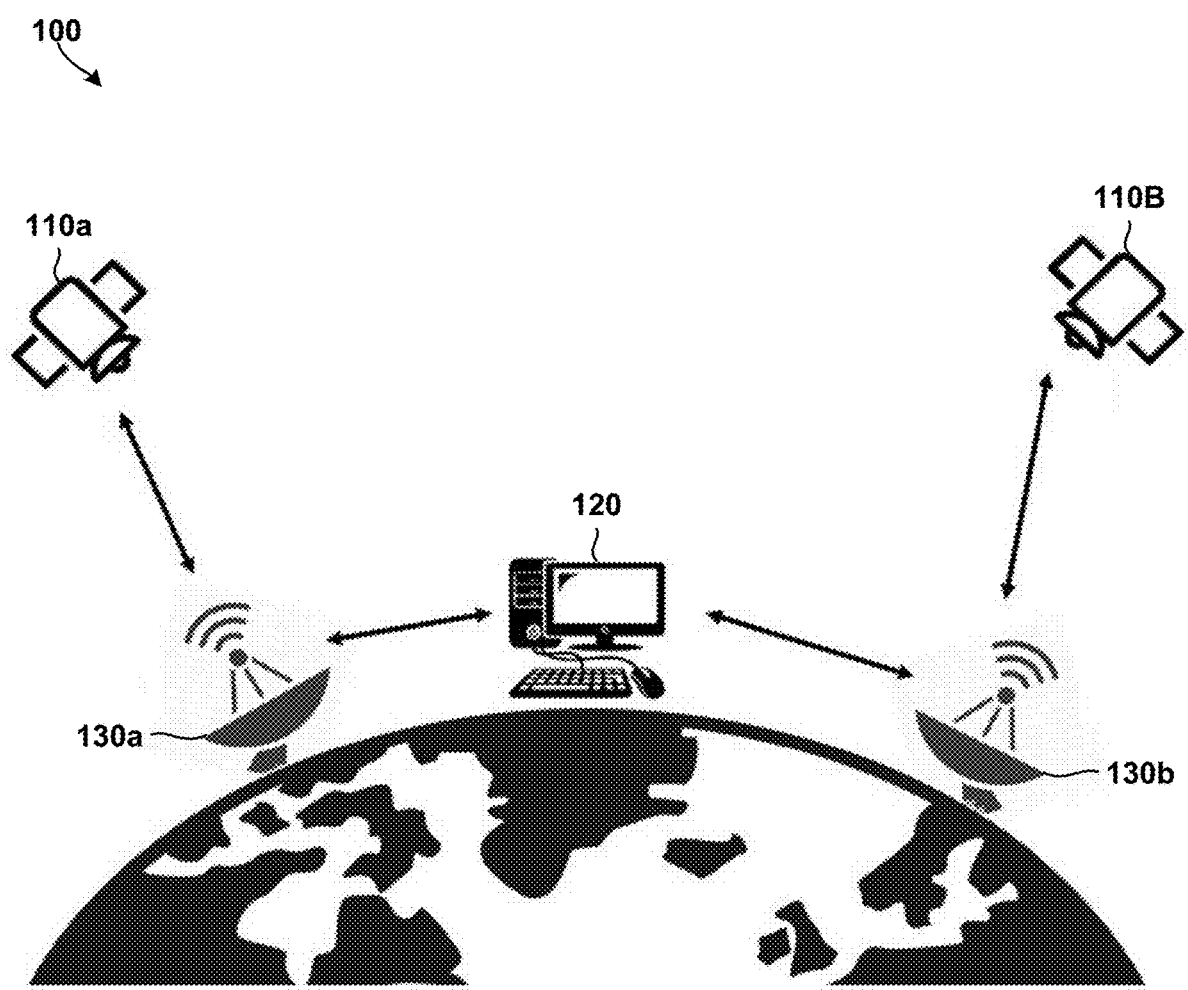
FIG. 1A is component block diagram illustrating a system, which includes edge devices in the form of satellites and a centralized site/device connected to a series of transmission sites, that is suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments include methods, and devices (e.g., centralized site server, embedded devices, etc.) configured to implement the methods, of dynamically updating the orchestration and operations of the processing nodes in a processing pipeline associated with an application post deployment without requiring the application to be recompiled and/or redistributed to the embedded device.

The embodiments disclosed herein enable a solution developer to have direct control over hardware blocks within the embedded system, without requiring embedded access (embedded source development, compilation). In this way the solution developer has direct access to configure the function-specific hardware blocks, or to develop pipelines in which there are mixed software and hardware nodes. The hardware blocks implement a specific function or (logical) group of functions that is defined in silicon in order to achieve high throughput at low power (i.e., outperform the equivalent software-defined implementation on a general processor). All hardware blocks exist in a single silicon device. Abstracting hardware block functionality via software wrappers or a high-level software API, while improving ease of use for the solution developer, often removes the low level configuration that is an essential element of efficient pipeline processing in devices supporting hardware-software pipelines, while simultaneously adding processing overhead. The embodiments provide ease-of-use abstraction without compromising on efficiency by allowing the solution developer to directly control the hardware (and optionally software) nodes at the lowest level.

The word "exemplary" may be used herein to mean "serving as an example, instance, or illustration." Any implementation described herein as "exemplary" is not necessarily to be construed as preferred or advantageous over other implementations.

The term "computing device" may be used herein to refer to any one or all of server computing devices, personal computers, laptop computers, tablet computers, edge devices, user equipment (UE), multimedia Internet enabled cellular telephones, smartphones, smart wearable devices (e.g., smartwatch, smart glasses, fitness tracker, clothes, jewelry, shoes, etc.), Internet-of-Things (IoT) devices (e.g., smart televisions, smart speakers, smart locks, lighting systems, smart switches, smart doorbell cameras or security systems, etc.), connected vehicles, and other similar devices that include a memory and programmable processor for providing the functionality described herein.

The terms "processing pipeline" and "pipeline" may be used interchangeably herein to refer to a combination of hardware blocks and software functionality under a programmable software control. For example, a processing pipeline may be a software-controlled hardware-software system that aims to provide both processing efficiency for particular tasks and adaptability, via software reconfiguration, for flexible use. Each processing pipeline may include a series of hardware blocks that each include a custom-tailored architecture focused on processing a specific task, such as the processing of image or audio data. The hardware blocks may be dynamically organized or positioned within a processing pipeline to implement a specific functionality. Unlike software only pipelines, and due to hardware constraints between blocks, the nodes in a processing pipeline may only be organized in select ways.

The term "multi-dimensional data processing system" may be used herein to refer to a system that processes multi-dimensional data (i.e., non-scalar data) producing either scalar or non-scalar output. For example, a multi-dimensional data processing system may accept as input one or more vectors, and/or one or more matrices, and/or one or more tensors, and zero, one, or more scalars. Examples of multi-dimensional data processing systems include systems that process audio data or image data. Multi-dimensional data processing systems are often important for processing data where there is inherent value in the relationships between the data dimensions.

The terms "node", "stage", and "filter" may be used herein to refer to a discrete piece of functionality within a processing pipeline, and each node may be executed at runtime using a generalized processor or a specialized hardware block.

The terms "runtime operational parameters", "runtime operational characteristics", "discrete runtime blocks", and "pipeline configuration" may all be used herein to refer to information that modifies the behavior of a processing pipeline at runtime. This modification may consist of modifying the number, order, arrangement, and orchestration of nodes within a processing pipeline. It may also consist of modifying the behavior (i.e., the internal operation) of nodes within a pipeline.

The term "edge device" may be used herein to refer to any one or all of computing devices, satellites, connected vehicles (trucks, cars, etc.), electric scooters, trains, trams, metros (which often only have connectivity for brief periods while in stations), aircraft, drones (based on land, in sea, or in the air), high-altitude balloons, smartphones, smart wearable devices, IoT devices, eMobility devices (e.g., electric scooters, electric bikes), robots, nanobots, and other similar computing systems, devices or objects that include a memory, a sensor, a processor, firmware, a hardware platform, and may include communications circuitry for communicating with computing devices at one or more centralized sites. The processor may be a programmable processor or a fixed programmed processor (e.g., a pre-programmed FPGA or an ASIC) with associated reconfigurable runtime operational parameters stored in an associated memory. Edge devices are often resource-constrained devices that have limited processing, memory, battery and/or bandwidth resources. An edge device may be, or may include, an embedded device.

The terms "centralized site" and "processing center" may be used herein to refer to a control site that includes one or more computing devices (or "centralized devices") that are configured to initiate, provision, store data on (e.g., collected data, data obtained from other sources, augmented data, etc.), enable labeling on, train, communicate with and/or control edge devices. For ease of reference and to focus the description on the relevant features or functionalities, some embodiments are described herein with reference to a "centralized site/device" on earth and one or more edge devices deployed in space. However, it should be understood that the described features and functionalities may be applicable to other types of edge devices, systems, configurations or deployments. As such, nothing in this application should be used to limit the claims or disclosures herein to a centralized site/device on earth and edge devices deployed in space unless expressly recited as such within the claims.

The term "neural network" may be used herein to refer to an interconnected group of processing nodes (or neuron models) that collectively operate as a software application or process that controls a function of a computing device and/or generates an overall inference result as output. Individual nodes in a neural network may attempt to emulate biological neurons by receiving input data, performing simple operations on the input data to generate output data, and passing the output data (also called "activation") to the next node in the network. Each node may be associated with a weight value that defines or governs the relationship between input data and output data. A neural network may learn to perform new tasks over time by adjusting these weight values. In some cases, the overall structure of the neural network and/or the operations of the processing nodes do not change as the neural network learns a task. Rather, learning is accomplished during a "training" process in which the values of the weights in each layer are determined.

As an example, the training process may include causing the neural network to process a task for which an expected/desired output is known, comparing the activations generated by the neural network to the expected/desired output, and determining the values of the weights in each layer based on the comparison results. After the training process is complete, the neural network may begin "inference" to process a new task with the determined weights.

The term "inference" may be used herein to refer to a process that is performed at runtime or during execution of the software application program corresponding to the neural network. Inference may include traversing the processing nodes in the neural network along a forward path to produce one or more values as an overall activation or overall "inference result."

The term "deep neural network" may be used herein to refer to a neural network that implements a layered architecture in which the output/activation of a first layer of nodes becomes an input to a second layer of nodes, the output/activation of a second layer of nodes becomes an input to a third layer of nodes, and so on. As such, computations in a deep neural network may be distributed over a population of processing nodes that make up a computational chain. Deep neural networks may also include activation functions and sub-functions between the layers. The first layer of nodes of a multilayered or deep neural network may be referred to as an input layer. The final layer of nodes may be referred to as an output layer. The layers in-between the input and final layer may be referred to as intermediate layers.

The term "convolutional neural network" may be used herein to refer to a deep neural network in which the computation in at least one layer is structured as a convolution. A convolutional neural network may also include multiple convolution-based layers, which allows the neural network to employ a very deep hierarchy of layers. In convolutional neural networks, the weighted sum for each output activation is computed based on a batch of inputs, and the same matrices of weights (sometimes called "kernels") are applied to every output. These networks may also implement a fixed feedforward structure in which all the processing nodes that make up a computational chain are used to process every task, regardless of the inputs. In such feed-forward neural networks, all of the computations are performed as a sequence of operations on the outputs of a previous layer. The final set of operations generate the overall inference result of the neural network, such as a probability that an image contains a specific object (e.g., a person, cat, watch, edge, etc.) or information indicating that a proposed action should be taken.

The terms "embedded device" and "embedded system" may be used interchangeably herein to refer to a computing system (e.g., combination of a processor, memory, input/output peripherals, etc.) that has a dedicated set of functions within a larger mechanical or electronic system (e.g., satellite system, etc.). An embedded device may include a hardware platform that includes an embedded application. In some embodiments, the embedded application may include a dynamic pipeline engine (DPE) runtime. In some embodiments, an embedded device may be an edge device.

Many contemporary embedded systems are now capable of performing neural network inference within practicable power budgets, and consequently there is a proliferation of AI-driven embedded devices/applications that process multi-dimensional data at source to produce an actionable result. Many of these applications use convolutional neural networks and apply them to image data, where this image data may be acquired by the embedded processor directly from a connected image sensor. However, it is a common trend with convolutional neural network architectures to use input layer (tensor) sizes that are significantly smaller than the raw size of the image captured at the sensor. Typically, this is in order to achieve higher frame throughput, as smaller input images imply less operations in the inference process and therefore a higher framerate or reduced power requirements. Similarly, the input image to a convolutional neural network may require pre-processing in order to ensure that the image matches the level of processing applied to the images that were used for training the network. Further, in order to achieve optimum inference results, the input image may benefit from several pre-processing steps that improve the image quality and fidelity. Such image signal processing steps may, for example, convert Bayer images into de-Bayered images, which are more representative of the images used for training most convolutional neural networks. Embedded processors that perform convolutional neural network inference on image frames from a directly connected sensor thus often require an element of image signal processing prior to inference. The steps required within the image signal processing are sensor dependent, and may also be dependent on the environment and the convolutional neural network itself. Some embodiments provide the ability to tune such image signal processing to best match the expected input of the inference step, which is important in developing a system that performs optimally, and indeed may be essential to achieving operation in some deployments. By enabling tuning of the image prior to inference, the use of a broader range of pre-trained convolutional neural network models is possible, since image signal processing modifications alone may accommodate for the variations in the image types expected at the input of different convolutional neural networks. This in turn may speed up development cycles, as existing convolutional neural network architecture and even existing trained models may be used, and network re-training may not be required.

Image sensor performance may also vary and degrade over the deployment lifetime of the sensor, and if these variations are not accounted for in an embedded system, then the system performance itself may degrade with time. Some embodiments may allow life-cycle updates to an image signal processor to accommodate such changes or variations, without having to compile and deploy a new embedded application.

In another scenario, some embodiments may provide a solution in which a data processing pipeline may continue to process data while at the same time undergoing runtime pipeline reconfiguration. This may enable minimum loss of sensor data while achieving a highly dynamic embedded data processing system. For example, an image processing paradigm might consist of a primary device connected to a secondary device, all within an embedded system. The secondary device may execute an image processing pipeline on data from a directly connected camera sensor, under the control of the primary device. The image pipeline may have been tuned for shady outdoor conditions. As the position of the sun moves during the day the lighting conditions change, meaning that a static processing pipeline will not perform optimally throughout the entire day. If the primary system contains an ambient light sensor, it could sense the amount of direct light and use this to modify the runtime operational parameters of the image processing pipeline on-the-fly, without the application running on the secondary device ever stopping processing frames. This ability to dynamically alter an image processing pipeline based on input from a secondary sensor, without ever requiring any pause to, or alteration or compilation of, the program executing the image processing pipeline, may provide for an extremely flexible system. It may also enable a continuously adaptable system that continuously responds to system and environmental variations in order to process data through a processing pipeline that is continuously driven/tuned to an optimum state. For example, the processing pipeline could be an image processing pipeline that performs signal processing on images from an earth observation sensor onboard a satellite. A secondary sensor might be a reflectometer. The original image processing pipeline may have been tuned for images captured of landmasses, where the reflection is generally low. In order to optimally process imagery from water bodies, the reflectometer may be used to tune the runtime operational parameters of the image processing pipeline on-the-fly to account for the increased reflection over bodies of water.

Further, the ability to modify a data processing pipeline at runtime in accordance with some embodiments may directly reduce the size of any pipeline update that is to be applied. A specific example of this is an image processing pipeline that contains filters for performing dewarp to remove geometric distortion in the output image. This type of filter may have a dewarp 'correction' table that is equal in size to the image frame size. The processing pipeline may also contain a hue correction filter, which may have associated runtime operational parameters in the order of tens of bytes. If the hue runtime operational parameters require updating in the processing pipeline, then the ability provided by the embodiments to update these without having to also re-transmit the very large correction table (which remains unchanged) is advantageous. This is particularly true of bandwidth-limited scenarios, for example updating processing pipelines on in-orbit satellites.

Another example of a system that would benefit from the ability to dynamically update a data processing pipeline at runtime in accordance with the embodiments is that of an image signal processing autotuner. In this scenario, a host system is connected to the embedded processor, and an image sensor is directly interfaced to the embedded processor. An image processing pipeline executes on frames captured from the sensor, and the frames are accessible from the host system. The operational environment and the scene being captured may be controlled (e.g., light level, light color temperature, calibration target present, etc.). The host system analyses each frame from the embedded system and compares it using some metric against one or more reference images. These reference images have been processed with manually tuned processing pipelines. An image registration stage may be applied to map the frame from the embedded system to the reference frame before the comparison metric is calculated. Based on the one or more metrics measured during the comparison stage, the image processing pipeline running on the embedded system is dynamically and automatically altered (auto-tuned) in a run-time feedback loop, to achieve a tuned pipeline that produces processed frames that match as closely as possible the reference frames. Note that this approach may handle variations across different models of sensors/optics, but also variations across different instances of the same sensor/optics (e.g., production variations). In an alternative version of the system, the metric may be calculated directly on the processed image from the embedded system, and no image comparison may be required. In another alternative implementation, the host system is not required and the autotuning process may occur entirely on the embedded system. In a further embodiment of the system, two such devices may be interfaced to the host (or to each other), and the system may dynamically tune one of the processing pipelines such that the two devices, with different sensors attached, are tuned to produce outputs that match as close as possible. In this way a tuned pipeline for a given sensor may be used to auto-tune a second processing pipeline on a second device that is interfaced to an alternative sensor, such that downstream applications, such as neural network inference, may be equally applied to data from the new sensor without requiring any updates.

Another example of a system that would benefit from the ability to dynamically update a data processing pipeline without altering the executing application in accordance with the embodiments is that of active noise reduction in image processing pipelines. This is the visual analogy of active noise cancellation in audio systems. The goal is to adapt the image signal processing pipeline to actively respond to varying noise characteristics in the image. An example system is that of a vision-enabled underwater robotic rover. Over the course of an underwater excursion, the relative movement of the rover and the water, combined with the variation in environmental conditions (e.g., light, depth, currents, aquatic life, pollution), means that the visible suspended particles in the water may vary in size. For a rover navigation system, such particles may introduce visual noise into the system, and may be a problem for, for example, navigational feature detection algorithms (such as ones for obstacle avoidance). The embodiments provide a continuously adaptive image signal processing pipeline that may be altered or tuned on-the-fly, without interrupting navigation or dropping frames, which may update the noise reduction filters and thereby achieve a reduced noise image. This adaptive noise reduction may thereby accommodate for variations in the water conditions. Similarly, a processing pipeline operating on images captured from a drone may be actively updated to accommodate variations in visual environmental conditions due to changes in altitude, weather, wind, stability, etc. For example, the processing pipeline may be dynamically altered to filter out snowflakes, or to accommodate air pollution or smoke by including/excluding snow/smog/smoke filter nodes, or by varying the strength of these processing nodes dynamically. Wind may affect stability and introduce motion blur and artefacts that may be compensated for in the processing pipeline under dynamic control.

A key requirement of many of the above systems and examples is that the runtime operational parameters of the data processing pipeline are/cannot be known at the time of compilation of the application that is executing the processing pipeline.

Some embodiments may include or provide a dynamic pipeline engine (DPE). The dynamic pipeline engine may be a component or system that accommodates the above requirements and provides a solution to the abovementioned (and similar) problems. Specifically, the dynamic pipeline engine may provide the ability to dynamically configure a multi-dimensional data processing pipeline on an embedded device. The dynamic pipeline engine may reduce or minimize the amount of data necessary to describe the processing pipeline. The dynamic pipeline engine may separate the implementation from end-user configuration/tuning. The dynamic pipeline engine may facilitate the design and run-time deployment of one or more data processing pipelines on an embedded system. The dynamic pipeline engine may allow new pipelines to be deployed without requiring that the application running on the embedded system be halted.

Conventional embedded applications are generally built ahead of time; that is, the structure of the application, and for visual data in particular the image processing pipelines, are statically constructed in source code, then compiled and optimized, before being deployed to the embedded device or devices. Updates to such embedded multi-dimensional processing applications may mean editing the source code or writing new source code to reflect the new processing pipeline design, compiling and optimizing this new pipeline, then uploading the new application containing this pipeline to the embedded device, typically as a flash memory update. After updating the device, it is then rebooted to cause the new application to come into effect, which means that the application stops while the reboot process completes. This may mean that either valuable real-time data acquisition may be lost or else the entire system needs to be temporarily suspended or stopped.

The dynamic pipeline engine allows a new processing pipeline configuration to be provided as the application executes, and enables the application to switch to the new processing pipeline transparently and without halting other activities. Moreover, no reboot of the embedded device is necessary, so valuable processing time is saved, resulting in a lower likelihood of losing valuable real-time sensor data. The dynamic pipeline engine thus provides an "Always On/Always Ready" solution for the application.

In addition to the requirement for dynamically updating the processing pipeline configurations, one of the areas of use for this technology is in terrestrial satellites, where direct access to the embedded device may be impossible, and the cost per-Byte of data transmitted from Earth to orbit is very costly, both in terms of time and monetary cost. Reducing the size of the data necessary to update the processing pipeline configuration is an important part of cost effectiveness and viability for the application. In these scenarios, the dynamic pipeline engine may provide a minimalistic approach for the data necessary to describe new processing pipeline configurations, allowing for new configurations to be deployed in a much more cost-effective (and timely) manner.

Most of the commercial embedded devices supporting multi-dimensional data processing capabilities require expensive licenses which are often a prohibitive overhead for customers who want to deploy processing pipelines in applications. Also, the complexity and programming skills necessary to build such applications often exceeds the capabilities available to smaller consumers of this type of technology. Finally, the people with the skills in configuring and tuning processing pipelines, and the people with the skills in embedded systems development, are often mutually exclusive sets of people.

By separating the configuration of processing pipelines from the implementation of the processing pipelines into a simple easy to use tool that enables solution developers to build and change their pipelines, free from the complexities of the proprietary technology needed to run those pipelines, the dynamic pipeline engine allows the technology to reach a far broader community, and allows the optimum use of expertise amongst embedded systems developers and solution developers.

Further, using conventional solutions, deploying or updating a pipeline on an embedded device may include editing the sources for the application, rebuilding the whole application, and uploading the entire application (which might be 500 MB or even larger) to the embedded device. The dynamic pipeline engine allows for the embedded application to be built once, and forms part of the initial deployment of the embedded device. For these and other reasons, the dynamic pipeline engine may allow for describing or updating a pipeline with as little as just 48 bytes.

FIG. 1A illustrates a system 100 that includes edge devices 110a, 110b that may be, or may include, an embedded device that could be configured in accordance with the embodiments. In the example illustrated in FIG. 1A, the system 100 includes edge devices 110a, 110b that are satellites in space, and a centralized site/device 120 that is connected to a series of transmission sites 130a, 130b dispersed around the world to provide suitable coverage.

Figure 1B:
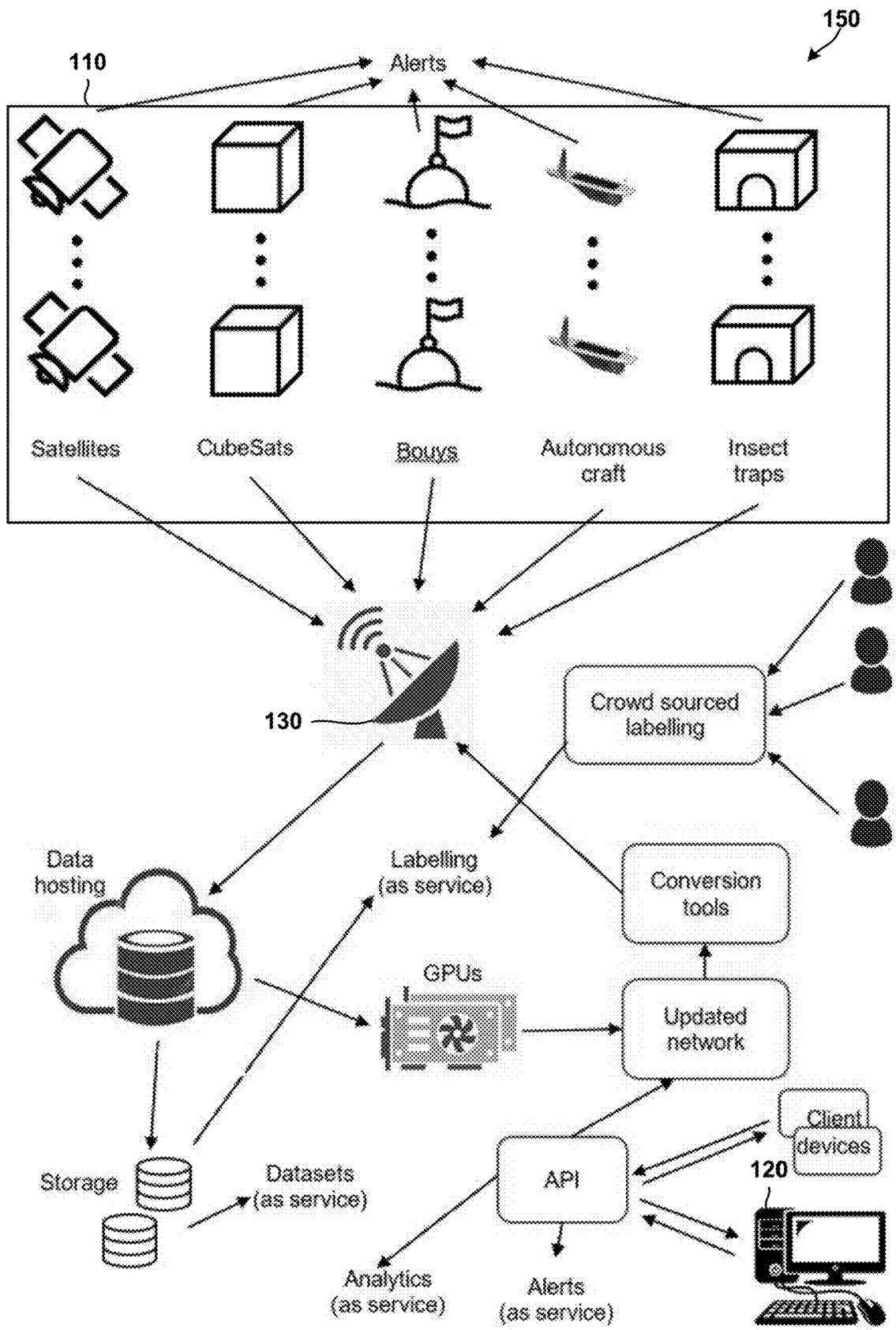
FIG. 1B is a component block diagram illustrating a system that includes different types of edge devices (i.e., a network of heterogeneous edge devices), and is suitable for implementing various embodiments.

FIG. 1B illustrates another system 150 that includes edge devices 110 that could be configured in accordance with the embodiments. In the example illustrated in FIG. 1B, the system 150 includes various different types of edge devices 110 (i.e., a network of heterogeneous edge devices). These heterogenous devices may be located underground, underwater (submersibles), on land (robots, e-mobility devices, mobile phones, IoT devices, insect traps), on the sea (watercraft, buoys), in the lower atmosphere (drones, planes), in the upper atmosphere (high altitude balloons), in earth orbit (satellites) or in deep space (exploration missions). Data collected from these edge devices 110 may be transmitted to the centralized site/device 120, from where it can be stored, processed, labelled, delivered, served, queried, analyzed, and used for training. In the AI context, this data may require some level of labelling before training can be initiated. Human-in-the-loop training may be accomplished via a crowd sourced labelling API. Training at the centralized site/device 120 may use general-purpose graphics processing units (GPGPUs) to enhance throughput.

The increasing compute performance and efficiency of embedded devices (embedded processors in edge devices 110, etc.) is resulting in increasingly capable and efficient embedded systems whose performance can meet the extensive demands of multi-dimensional data processing applications. Chief among these applications is that category which processes image data, which is often acquired in raw format from directly-connected image sensors. Other examples include audio data processing, radar data processing, and other Radio Frequency (RF) data processing. A range of embedded processors, or system-on-chip (SoC) solutions, have been developed that address these application spaces. Such SoCs may include CPUs, GPUs, VPUs and/or FPGAs.

A trend with some of these system-on-chips is to have tailored architectures that accelerate certain tasks, such as the processing of image or audio data, often achieving this by combining hardware blocks with software functionality, all under programmable software control, in order to form processing pipelines. Such processing pipelines or software-controlled hardware-software systems aim to provide both processing efficiency for particular tasks and adaptability, via software reconfiguration, for flexible use.

Figure 2A:
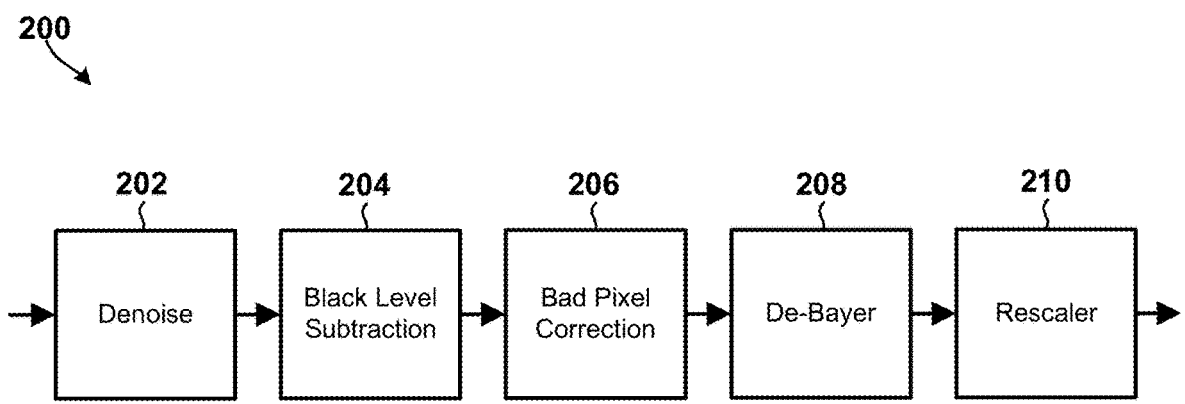
FIGS. 2A and 2B are component block diagrams illustrating processing pipelines in accordance with some embodiments.

FIG. 2A illustrates an exemplary processing pipeline 200 for processing images that consists of five nodes. The "Denoise" node 202 may be used to remove general noise (which may be specific to the image sensor) from the image. The "Black level subtraction" node 204 may be used to remove noise that is specific to the black parts of the image. The "Bad pixel correction" node 206 may be used to correct pixel errors originating from damaged areas of the image sensor. These damaged areas may always have been present in the image sensor, or they may have become damaged over time while the image sensor was operational. The "Debayer" node 208 may be used to provide a de-Bayering filter. The "Rescaler" node 210 may be used to resize the image. The output of this node could be used as input to a neural network. Each of the nodes could be performed using a generalized processor or a specialized hardware block. Any or all of the nodes 202-210 may have more than one input and more than one output, such that there can be splits and merges in the pipeline. Similarly, a processing pipeline could have multiple inputs (e.g., an image from RGB sensor and an image from an infrared sensor) and/or multiple outputs. Further, in addition to hardware nodes, software nodes may also be developed and made available to include within the processing pipelines.

Figure 2B:
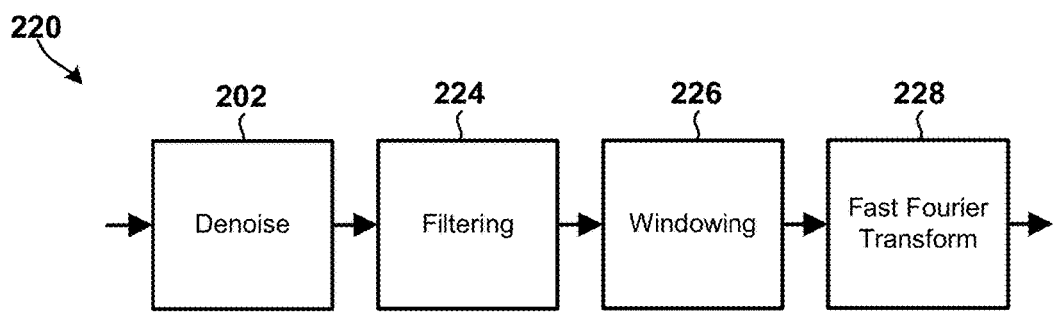

FIG. 2B illustrates an exemplary processing pipeline 220 for processing audio information that consists of four nodes. The "Denoise" node 202 may be used to remove general noise, which may be specific to the microphone sensor from the audio information. The "Filtering" node 224 may be used to remove specific frequencies from the audio information. The "Windowing" node 226 may be used to window the audio information. The "Fast Fourier transform" node 228 may be used to perform a fast Fourier transformation on the audio information. The output of this node could be used as input to a neural network. Each of the nodes could be performed using a generalized processor or a specialized hardware block.

The processing pipelines 200, 220 discussed above provide user-driven software reconfigurability. Yet, using conventional solutions, such user-driven software reconfigurability is predicated on a develop-compile-execute paradigm, where the reconfigurability is performed by the coder prior to any solution deployment (i.e., prior to compilation). Any updates to the system may require the download of a new (compiled) application image to the hardware. In many application spaces this may limit, or entirely eradicate, the user's ability to modify or tune the deployed system. For example, the application image may be orders of magnitude larger than the runtime operational parameters that have been tuned (i.e., modified). For deployed devices, where updates have to be transmitted over low-bandwidth connections to the device, this may limit how often or at what cost the new tuned runtime operational parameters may be deployed. As such, updating the device may be extremely challenging and time consuming, particularly for owners and end users of the deployed system who do not have access to, or competence with, the original application source or compile tools. This may be a particular problem for multi-dimensional data processing systems, since often the domain experts with the multidimensional data processing skills do not also have the requisite embedded software development skills.

An example of this scenario is an embedded device (embedded IoT solution) that detects corner features in frames captured from a connected image sensor, and returns this feature data over-the-air to a centralized site. Data reduction, and therefore system efficiency, may be achieved by only transmitting the extracted corner feature data rather than the entire image frame. At the control processing location this feature data may be used to, for example, perform geometry estimation. Prior to corner extraction the embedded processing algorithm may perform several steps to, for example, improve image brightness or contrast, or to reduce image noise (filtering). Each device deployment may be in a different physical location, experiencing different environmental conditions that may affect the brightness or contrast enhancement, or the noise filtering. The physical location and/or environmental conditions may vary from device to device, or may vary over the lifetime of the device. By definition, the most appropriate image processing runtime operational parameters cannot be known in advance, and in-situ updates to tune the image processing pipelines are desirable. In this scenario, parameter tuning post-deployment, by the end-user/owner, would be beneficial.

A second example is that of an embedded device (a satellite-deployed embedded processing system) that processes earth observation data ('satellite imagery') or deep space scientific observation ('telescope') data. In each of these cases the images captured on-satellite may be processed for further on-board analysis, for example in order to perform object or event detection. Real-time fire detection from earth observation data is an example use case. Prior to applying the fire detection algorithm, the captured images must be processed and transformed into a format that is suitable for the detection algorithm. This process, often called image signal processing (ISP), may involve many tuneable runtime operational parameters that are dependent on the imaging hardware (e.g., sensor, optics, baffle, etc.) and on environmental and positional factors (e.g., ground elevation, relative sun orientation, satellite attitude, weather conditions on the surface of earth, etc.). Although some of these factors may be accounted for during the tuning process pre-launch, others may only be accommodated in the image processing pipeline during in-flight commissioning and subsequent operation. Some runtime operational parameters may even require re-configuration based on physical system changes that may occur during the launch stage or due to wear and tear. In another scenario, the image signal processing may be modified based on post-launch development on the ground (in order to compress the development cycle), and these modifications need to be applied to the orbital platform.

In both of these examples, the ability to independently and dynamically update (e.g., tune, modify, etc.) the runtime operational parameters of the image signal processing pipelines, without updating the application itself, would enable reduced uplink requirements, reduce or eliminate the access requirement to source code and compilation tools, eliminate any dependence on source level understanding of the embedded system, and eliminate any requirements to perform on-device compilation (which is performed much more efficiently at the processing center/on the ground).

The various embodiments include methods, and components (e.g., embedded devices, etc.) configured to implement the methods, for independently and dynamically updating (e.g., tuning, modifying, etc.) the runtime operational parameters of the image signal processing pipelines, without updating the application itself. As such, the embodiments may enable reduced uplink requirements, may reduce or eliminate the access requirement to source code and compilation tools, may eliminate any dependence on source level understanding of the embedded system, and/or may eliminate any requirements to perform on-device compilation.

Figure 3A:
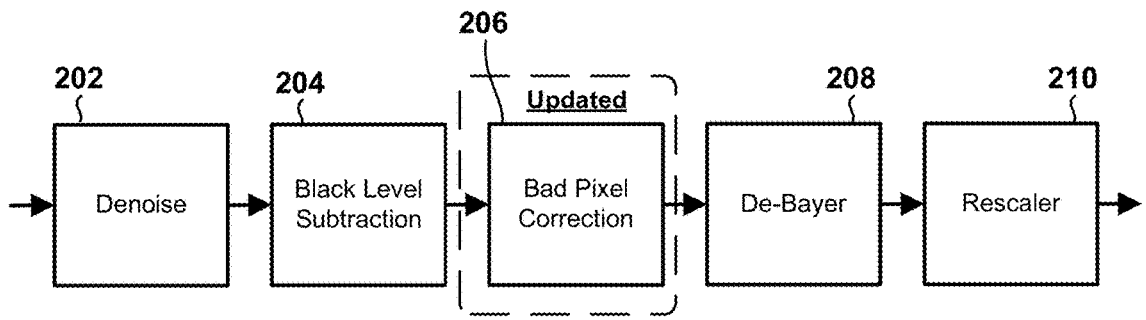
FIGS. 3A through 3C are component block diagrams illustrating dynamically updated processing pipelines in accordance with some embodiments.
Figure 3B:
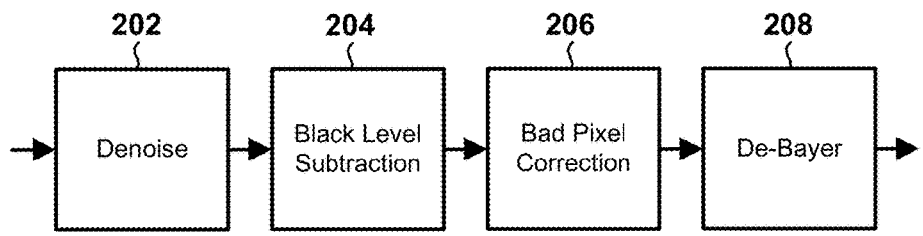
Figure 3C:
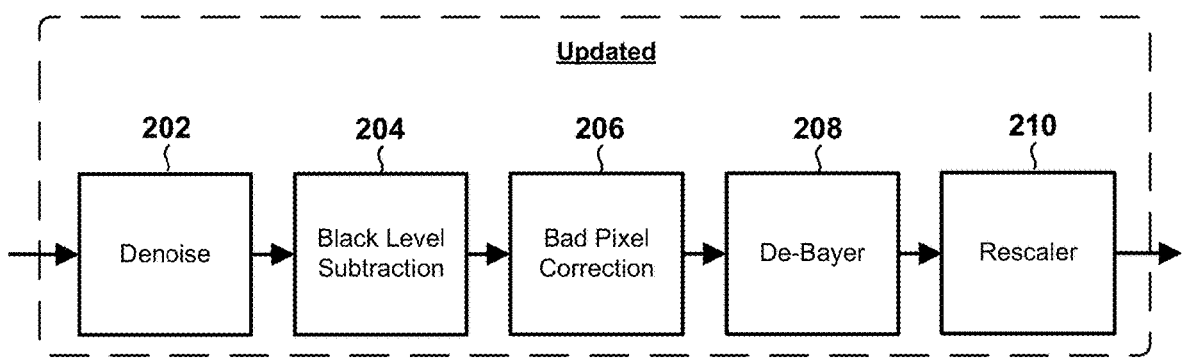

FIG. 3A-3C illustrate that the pipeline configuration associated with the processing pipeline 200 (illustrated in FIG. 2A) may be modified by a dynamic pipeline engine (DPE) configured in accordance with some embodiments. In FIG. 3A, the runtime operational parameters associated with the internal operations of the "Bad pixel correction" node 206 are updated in response to determining that the image sensor has deteriorated and that it now has more damaged areas. In FIG. 3B, the runtime operational parameters associated with the processing pipeline 200 may be updated to remove the "Rescaler" node 210 from the end of the processing pipeline 200. In FIG. 3C, the runtime operational parameters associated with the entire processing pipeline 200 (Nodes 202-

210) are updated (i.e., hot swapped) in response to a repurposing of the operational requirements (i.e., the edge device upon which the processing pipeline is executing may be used for a different purpose, task, or mission, or may be applied to input from a different sensor).

Figure 4A:
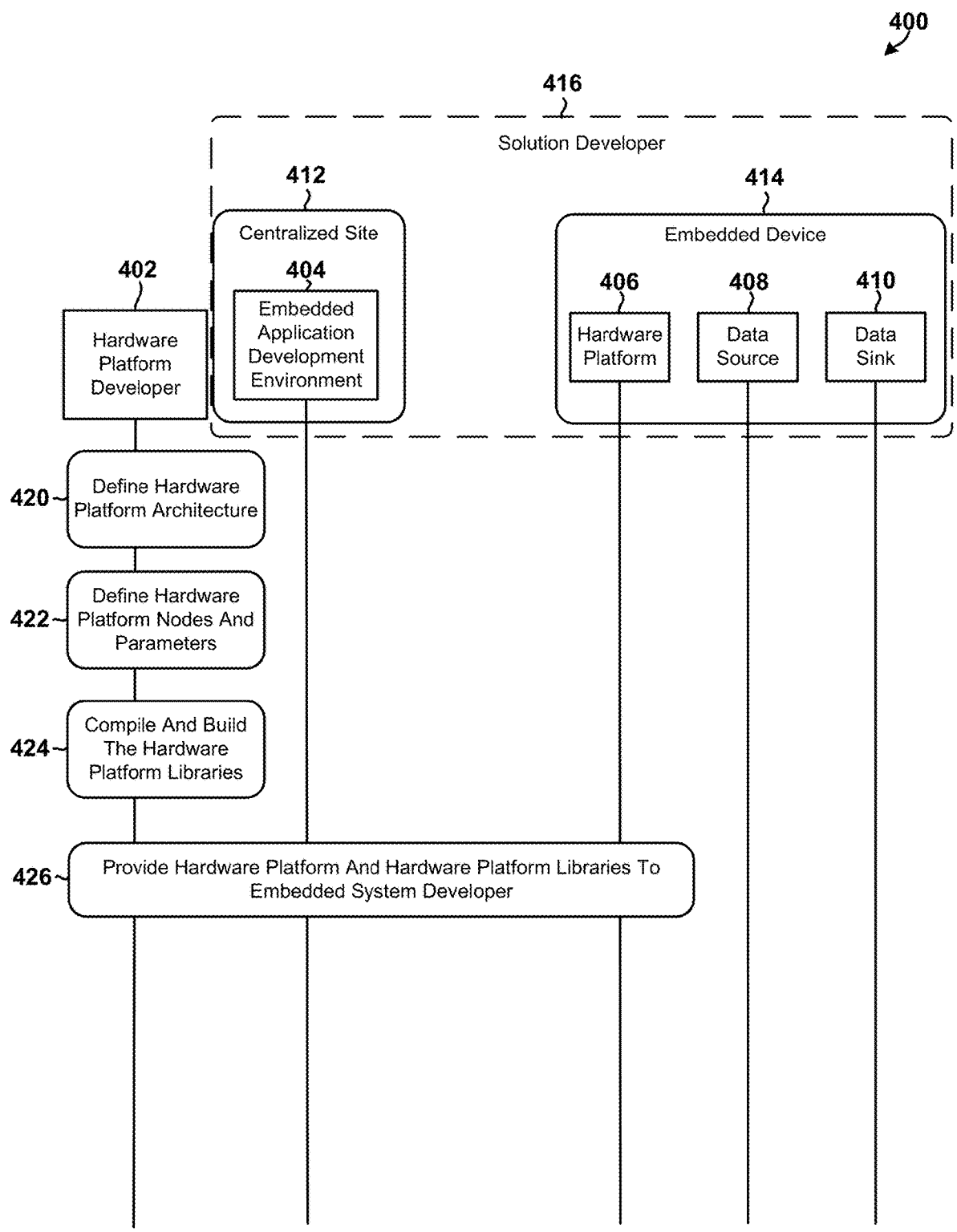
FIGS. 4A through 4C are activity diagrams illustrating components, operations and communications in a system configured to updated an embedded application.
Figure 4B:
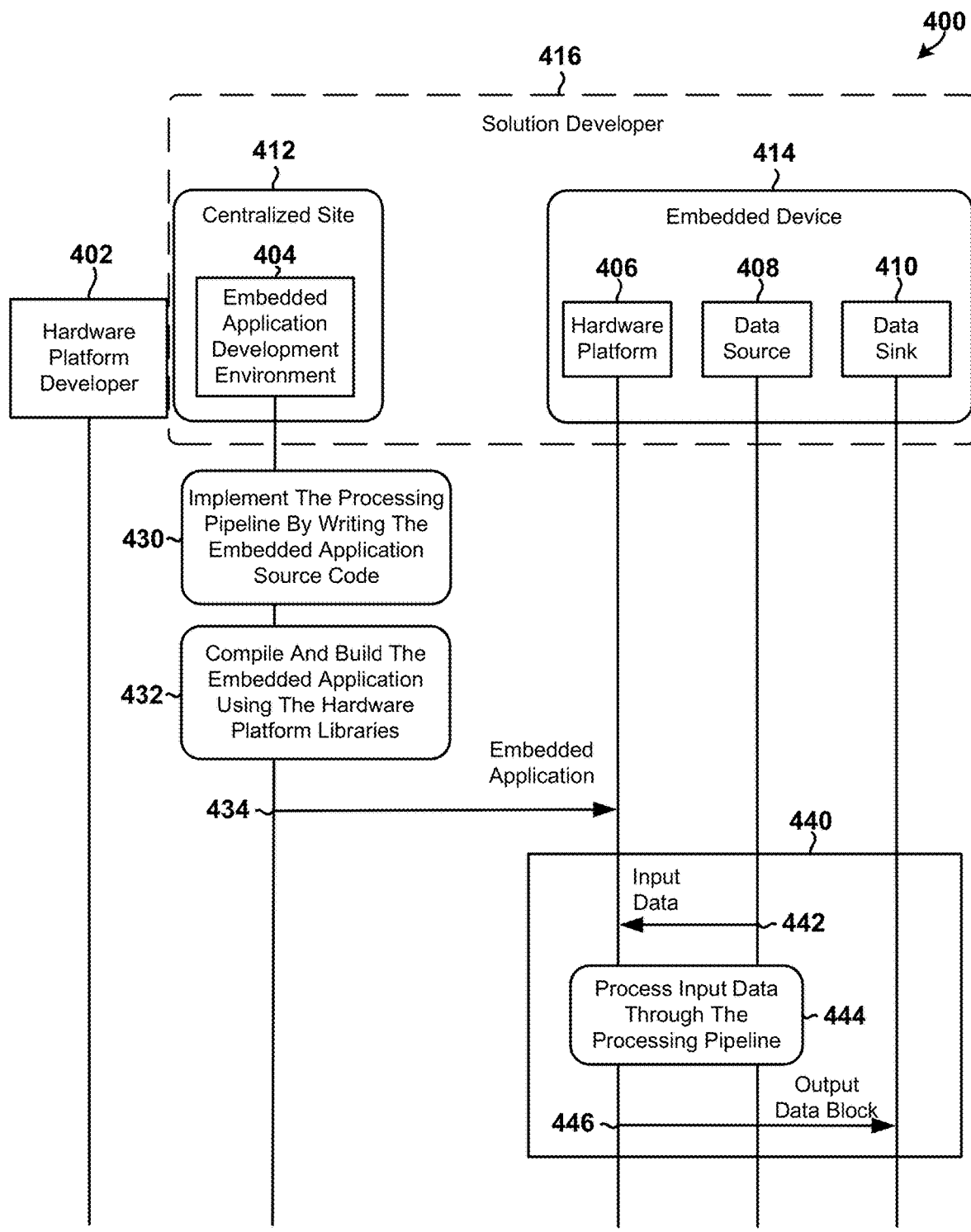
Figure 4C:
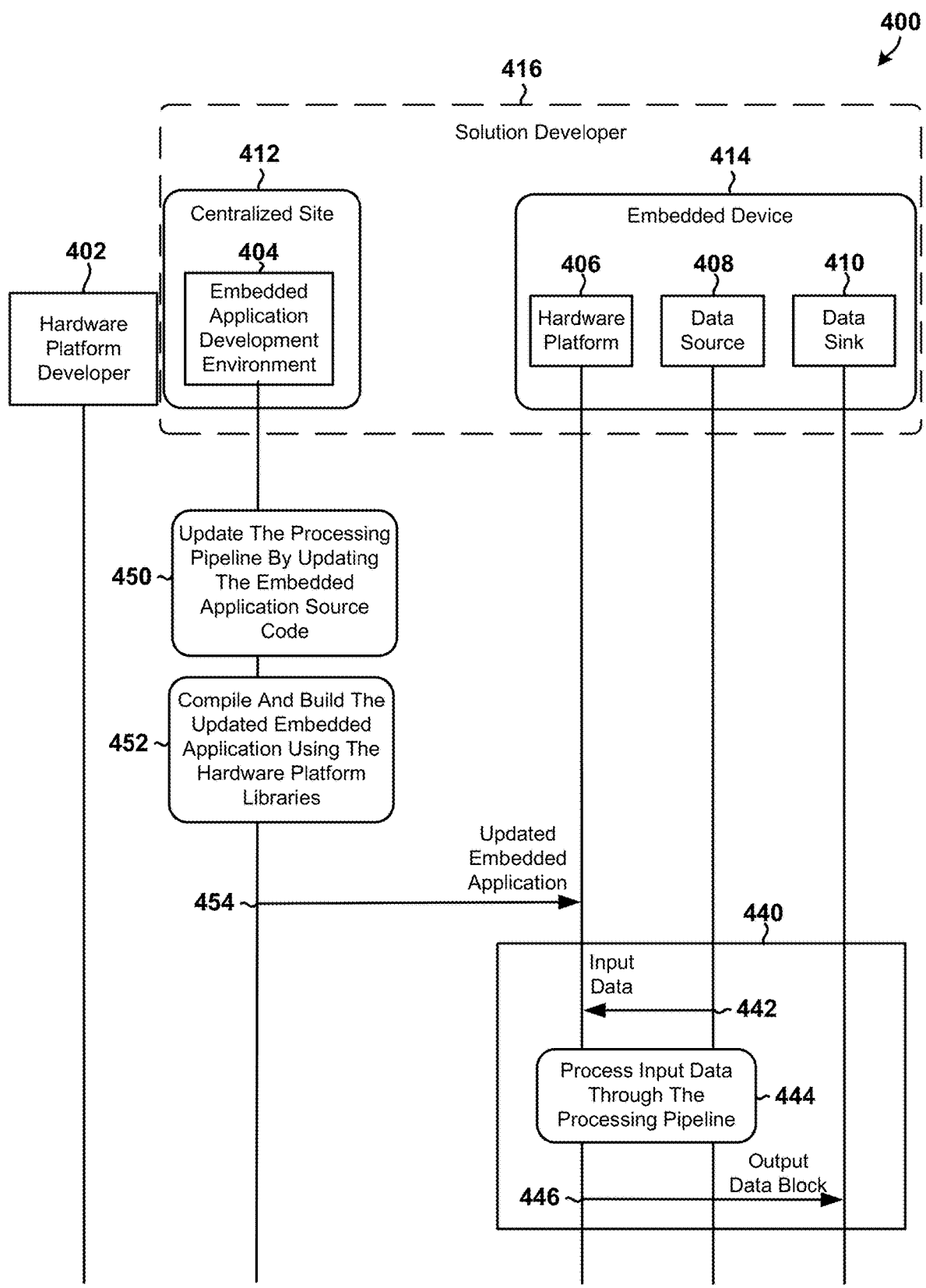

FIG. 4A-4C illustrate a method 400 of designing and deploying a processing pipelines on an embedded device according to the conventional develop-compile-execute paradigm. In the examples illustrated in FIGS. 4A-4C, the method 400 is performed in a system that includes two entities, namely a hardware platform developer 402 (e.g., Intel, ARM, etc.) and a solution developer 416. The solution developer 416 includes a centralized site 412 and one or more embedded devices 414, which may be deployed to remote locations (e.g., each embedded device could be a satellite that forms part of a constellation). The centralized site 412 includes an embedded application development environment 404. Each embedded device 414 includes a hardware platform 406, a data source 408, and a data sink 410.

In some embodiments, the solution developer 416 may include both embedded application development capabilities (e.g., the ability to write source code, the compilers necessary to compile the source code, etc.) and solution development capabilities (e.g., domain specific skills relating to the purpose of the solution, etc.) at the centralized site 412. In some embodiments, the embedded device 414 may include multiple data sources 408 and multiple data sinks 410.

With reference to FIG. 4A, in operation 420, the hardware platform developer 402 may define the hardware platform architecture. In operation 422, the hardware platform developer 402 may define the hardware platform nodes and their associated parameters. In operation 424, the hardware platform developer 402 may compile and build the hardware platform libraries. In operation 426, the hardware platform developer 402 may provide the hardware platform and the hardware platform libraries to the solution developer 416. This may occur using any suitable mechanism (e.g., the hardware platform may be physically distributed, and then hardware platform libraries may be made available for downloading from a web site). There may be a significant time gap between operations 424 and 426 (e.g., the hardware platform may be available on the market for several years before the solution developer acquires it). Indeed, the hardware platform developer 402 is no longer involved in the process, and does not need to have any visibility of how the solution developer 416 is using the hardware platform.

With reference to FIG. 4B, in operation 430, the solution developer 416 (e.g., at the centralized site 412, using the embedded application development environment 404, etc.) may implement the processing pipeline by writing the embedded application source code. In operation 432, the solution developer 416 may compile and build the embedded application using the hardware platform libraries. In operation 434, the solution developer 416 may transfer and load the embedded application onto the hardware platform 406 in the embedded device 414. It should be noted that operations 430-434 may require the solution developer 416 to have robust embedded software development skills, knowledge or capabilities.

The embedded device 414 may perform the operations in block 440 after or in response to receiving or loading the embedded application in block 434. For example, in operation 442, the hardware platform 406 may receive a block of input data from the data source 408. In operation 444, the embedded application on the hardware platform 406 may process the input data through the processing pipeline. In operation 446, the hardware platform 406 may output the processed block of data to the data sink 410.

Operations 430-440 may occur pre-deployment or post-deployment of the embedded device 414. For example, operations 430-434 may occur pre-deployment, and the operations in block 440 may occur post-deployment.

FIG. 4C illustrates operations 450-454, 440-446 that occur when the solution developer 416 needs to update or replace the processing pipeline that is already deployed in the embedded device 414. In operation 450, the solution developer 416 (e.g., at the centralized site 412, using the embedded application development environment 404, etc.) may update the processing pipeline by updating or replacing the embedded application source code. In operation 452, the solution developer 416 may compile and build the updated embedded application using the hardware platform libraries. In operation 454, the solution developer 416 may transfer and load the embedded application onto the hardware platform 406 in the embedded device 414. The embedded device 414 may perform the operations in block 440 after or in response to receiving or loading the embedded application in block 454.

Thus, in the above example, the solution developer 416 transfers and loads the embedded application onto the hardware platform 406 in the embedded device 414. Since embedded applications are typically very large (e.g., hundreds of megabytes), this operation may not be practical with some embedded devices 414 due to bandwidth and cost limitations in sending data to the embedded device 414. It should also be noted that operations 450-454 may require the solution developer 416 to have robust embedded software development skills, knowledge or capabilities.

FIGS. 5A-5G illustrate a method 500 of designing and deploying one or more data processing pipelines on an embedded system without requiring the application running on the embedded system to be halted and replaced with a new embedded application. There are three entities involved in this process: the hardware platform developer 402 (e.g., Intel, ARM), the embedded system developer 502, and the solution developer 416.

The embedded system developer 502 may include an embedded application development environment 404. The solution developer 416 may include a centralized site 412 and one or more embedded devices 414, which may be deployed to remote locations (e.g., each embedded device could be a satellite that forms part of a constellation). The centralized site 412 may include a processing block orchestrator tool 504, which it may receive from the embedded system developer 502. The embedded device 414 may include one or more hardware platforms 406, one or more data sources 408, and one or more data sinks 410.

The solution developer 416 needs only solution development capabilities (e.g., domain specific skills relating to the purpose of the solution) at the centralized site 412, because it may take advantage of the processing block orchestrator tool 504. In contrast, using conventional solutions, the solution developer 416 would additionally need embedded application development capabilities (e.g., the ability to write source code, the compilers necessary to compile the source code) in order to incorporate hardware blocks within its processing pipelines.

The hardware platform developer 402 may be configured to develop a hardware platform 406 that it is agnostic to all solutions, embedded applications, and processing pipelines. It should be noted that in the examples illustrated and described in FIGS. 5A-5G, the hardware platform developer 402 does not need to distinguish between the embedded system developer 502 and the solution developer 416. It may view them both as solution developers 416.

The embedded system developer 502 may develop a dynamic pipeline engine. This may include creating both the embedded application and the processing block orchestrator tool 504, and may be done infrequently and independently of the solution developer 416 (e.g., as part of normal product development when new features are added to either the dynamic pipeline engine runtime and/or processing block orchestrator tool 504). The embedded application and the processing block orchestrator tool 504 may be agnostic to all solutions and processing pipelines. The embedded application and the processing block orchestrator tool 504 may be the only pieces of software that need to be developed (e.g., source code written and compiled), and the embedded application may contain the dynamic pipeline engine runtime. In some embodiments, as part of developing the embedded application and the processing block orchestrator tool 504, the embedded system developer 502 may also create a configuration data schema.

The embedded system developer 502 may also create a pipeline node characteristics file that defines the available nodes in a specific hardware platform 406 for executing steps in a data processing pipeline. It may also capture a description of the possible runtime operational parameters for each node (e.g., a list of parameter names, which may be assigned with parameter values). Pipeline node characteristics may be created relatively frequently (e.g., each time that a hardware platform developer 402 releases a new or updated hardware platform 406). The pipeline node characteristics may include details relating to the inputs available (e.g., stereo inputs to an audio processing pipeline, trinocular inputs to an image processing pipeline to support three viewpoints), the number of processing channels (e.g., one each for red, green, and blue in an image processing pipeline), etc.

The processing block orchestrator tool 504 may be a software tool used by the solution developer 416 for defining and modifying processing pipelines that are application specific. The processing block orchestrator tool 504 may generate a pipeline configuration descriptor (also referred to as a Blob) that is a single file containing all of the solution specific pipeline configuration data for the hardware platform 406 in a specific embedded device 414. Each pipeline configuration descriptor may contain one or more pipeline configurations (e.g., with reference to the previous example of the earth observation sensor onboard a satellite, a single pipeline configuration descriptor may contain one pipeline configuration for use with images captured over landmasses and one pipeline configuration for use with images capturing over bodies of water), and there may be multiple pipeline configuration descriptors for a single application. The pipeline configuration descriptor may be a compressed and optimized binary file in order to facilitate efficient transmission to edge devices. The processing block orchestrator tool 504 does not require the solution developer 416 to have any software or embedded application development capabilities (e.g., the ability to write source code, the compilers necessary to compile the source code).

The hardware platform 406 contains the embedded application, which in turn includes the dynamic pipeline engine runtime that executes the processing pipeline on an embedded device 414. The dynamic pipeline engine runtime was previously integrated into the embedded application at compile time by the embedded system developer 502. It accepts pipeline configuration descriptors at runtime, and it applies these to the embedded application (i.e., to the processing pipeline as a whole and/or to individual nodes within the pipeline). The dynamic pipeline engine runtime interprets the pipeline configuration descriptors when it detects that they have been updated. This is a once-off task for each update, and it may be used to build an optimized implementation of the processing pipelines described by the pipeline configuration descriptors. The pipeline configuration descriptors themselves are not interpreted during pipeline processing, so there is no performance penalty associated with their initial interpretation. It should be noted that no compilation changes are required to the embedded application.

The data source 408 is the source of data to the processing pipeline running on the embedded system. The source may be a sensor (image sensor, radar sensor, audio microphone), or it may be a host connected to the embedded system (e.g., submitting stored images for processing through the processing pipeline). The embedded system may have multiple data sources 408.

The data sink 410 is the destination for which the processing pipeline prepares the data (e.g., a data store for storing processed images to local memory, or returning processed images to a host). The embedded system may have multiple data sinks 410.

In an example embodiment where the processing pipeline is implemented within a satellite, the precompilation stage and the processing block orchestrator tool 504 are used on Earth (e.g., in the processing center), whereas the hardware platform 406, the data source 408, and the data sink 410 are all within the deployed satellite. Thus, there could be one precompilation stage and one processing block orchestrator tool 504, but there would be a runtime, data source 408, and data sink 410 per satellite. The data source 408 could be one or more image sensors in the satellite, and the data sink 410 could be a neural network that is operating within the satellite.

Figure 5A:
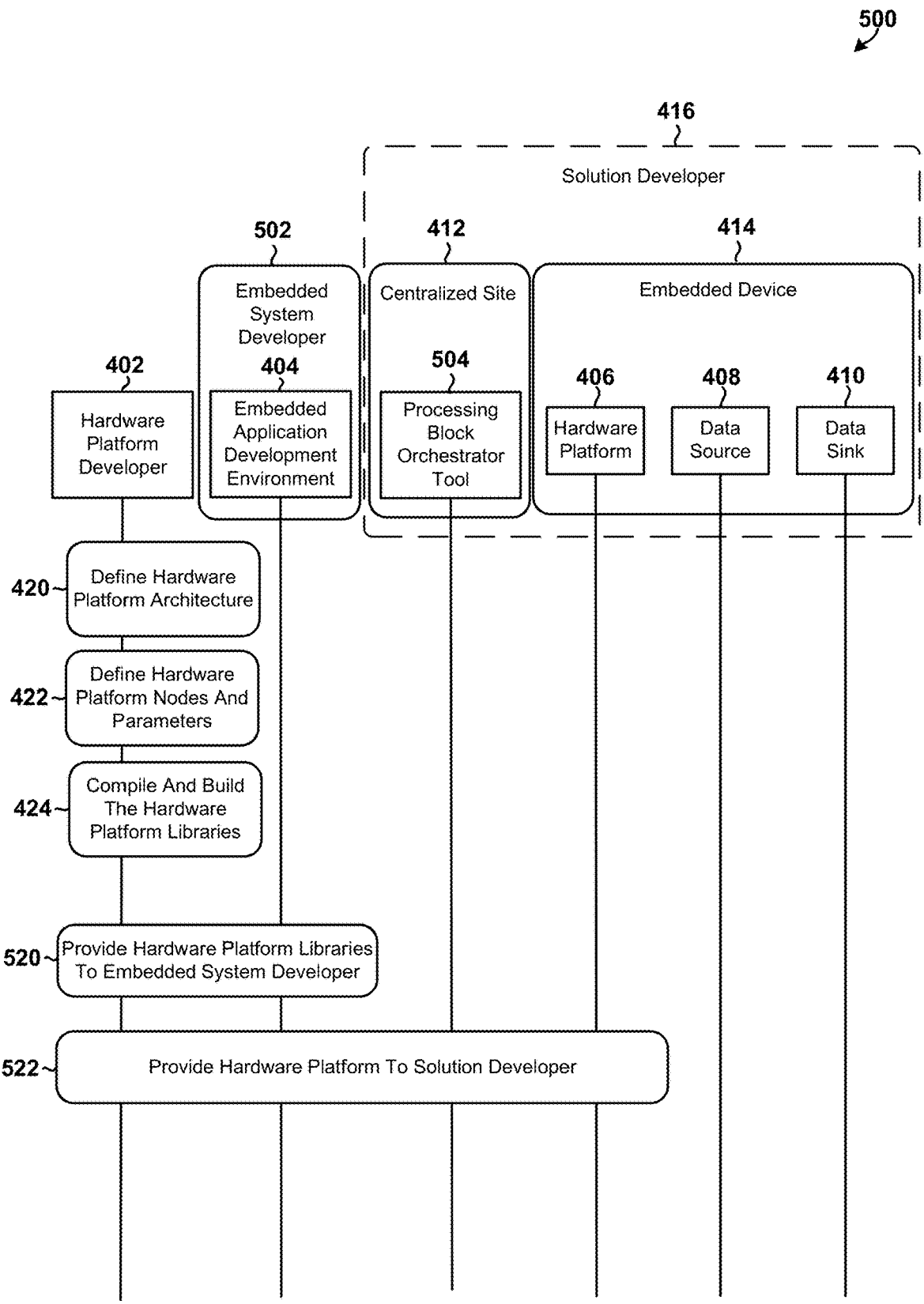
FIGS. 5A through 5G are activity diagrams illustrating components, operations and communications in a system configured to updated the embedded application in accordance with the embodiments.

With reference to FIG. 5A, in operations 420-424, the hardware platform developer 402 may perform the same operation discussed above with reference to FIG. 4A. In particular, in operation 420, the hardware platform developer 402 may define the hardware platform architecture. In operation 422, the hardware platform developer 402 may define the hardware platform nodes and their associated parameters. In operation 424, the hardware platform developer 402 may compile and build the hardware platform libraries.

In operation 520, the hardware platform libraries may be provided to the embedded system developer 502. In operation 522, the hardware platform 406 may be provided to the solution developer 416. Operations 520 and 522 may occur using any suitable mechanism (e.g., the hardware platform may be physically distributed, and then hardware platform libraries may be made available for downloading from a web site). There may be a significant time gaps between the operations (e.g., the hardware platform 406 may be available on the market for several years before the solution developer 416 acquires it). Indeed, the hardware platform developer 402 is no longer involved in the process, and it does not need to have any visibility of how the embedded system developer 502 and the solution developer are using the hardware platform 406.

Figure 5B:
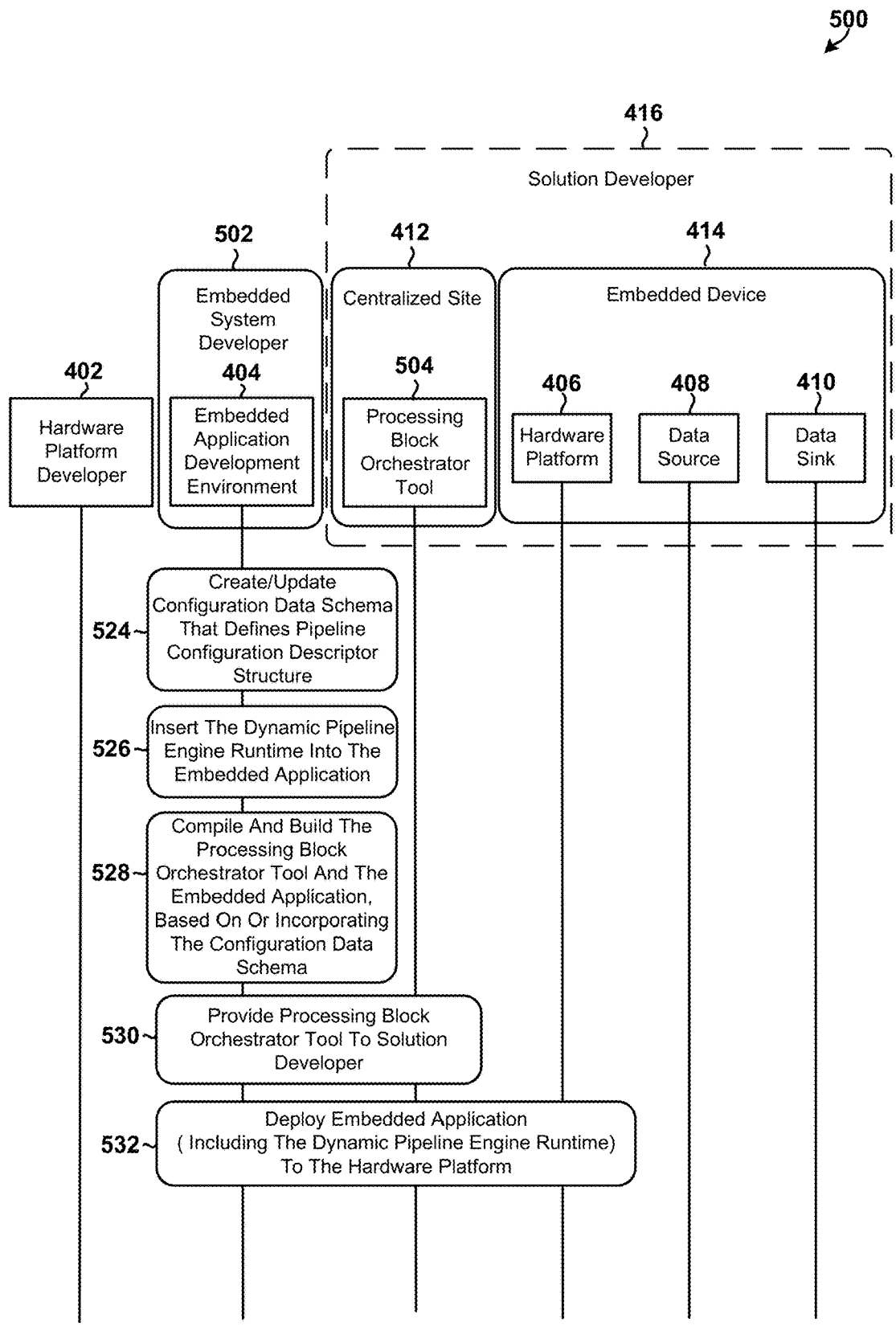

With reference to FIG. 5B, in operation 524, the embedded system developer 502 may create/update configuration data schema that defines a pipeline configuration descriptor structure. In operation 526, the embedded system developer 502 may insert the dynamic pipeline engine runtime into the embedded application. In operation 528, the embedded system developer 502 may compile and build the processing block orchestrator tool 504 and the embedded application based upon or incorporating the configuration data schema. In operation 530, the embedded system developer 502 may provide the processing block orchestrator tool 504 to the solution developer 416. In operation 532, the embedded system developer 502 may deploy the embedded application (including the dynamic pipeline engine runtime) to the hardware platform 406.

Thus, the embedded system developer 502 may create and distribute the embedded application and the processing block orchestrator tool 504. As previously described, this may occur infrequently. The embedded system developer 502 may also define the pipeline configuration descriptor structure in the configuration data schema (e.g., using a software tool), insert the dynamic pipeline engine runtime into the embedded application (e.g. by incorporating it into the source code for the embedded application, by using either static or dynamic linking), compile and build the processing block orchestrator tool 504 and the embedded application, provide the processing block orchestrator tool 504 to the solution developer (e.g., as part of a software licensing agreement), and deploy (e.g., transfer, flash, etc.) the embedded application to the hardware platform 406. In some embodiments, the embedded system developer 502 may release the new/updated configuration data schema to solution developers 416 that already have the processing block orchestrator tool 504 as a software update (i.e., without having to build and distribute the entire processing block orchestrator tool 504 in operations 528 and 530). In some embodiments, the embedded application may be deployed by the embedded system developer 502 providing it to the solution developer 416, and the solution developer 416 then deploying it. This may occur after the embedded device 414 has been deployed. After operations 530 and 532, the embedded application is ready to execute (it may be assumed that the application continues to run until some external stimulus ends execution).

Figure 5C:
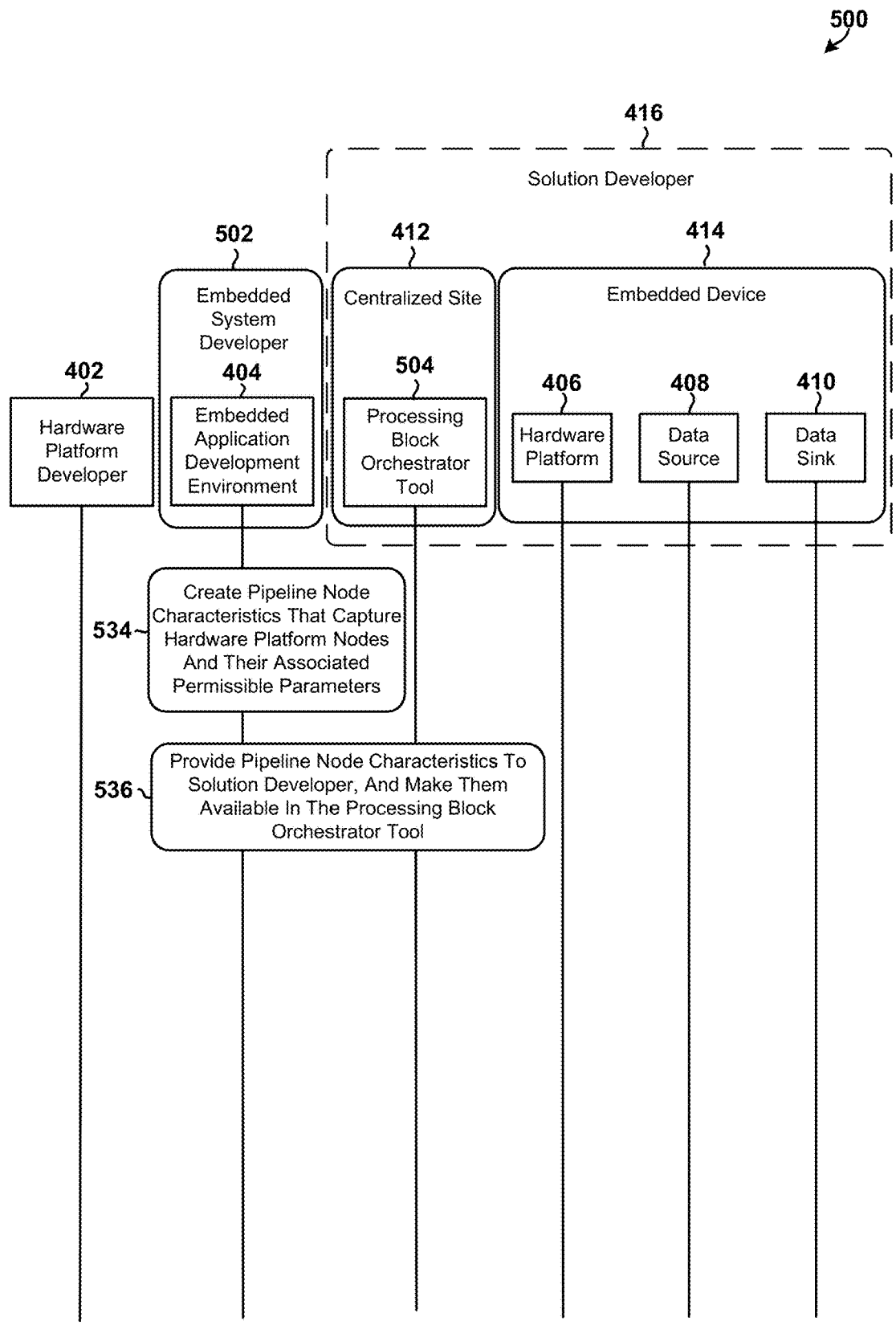

With reference to FIG. 5C, in operation 534, the embedded system developer 502 may create pipeline node characteristics that capture hardware platform nodes and their associated permissible parameters. In operation 536, the embedded system developer 502 may provide the pipeline node characteristics to the solution developer 416, and make them available in the processing block orchestrator tool 504. In an embodiment, the processing block orchestrator tool 504 may automatically retrieve these after they have been published by the embedded system developer 502 (e.g., from a web site). It should be noted that after operation 536, the embedded system developer 502 is no longer involved in this process, and there is no further source code being written or compiled. It should also be noted that the pipeline configuration has not yet been created.

Figure 5D:
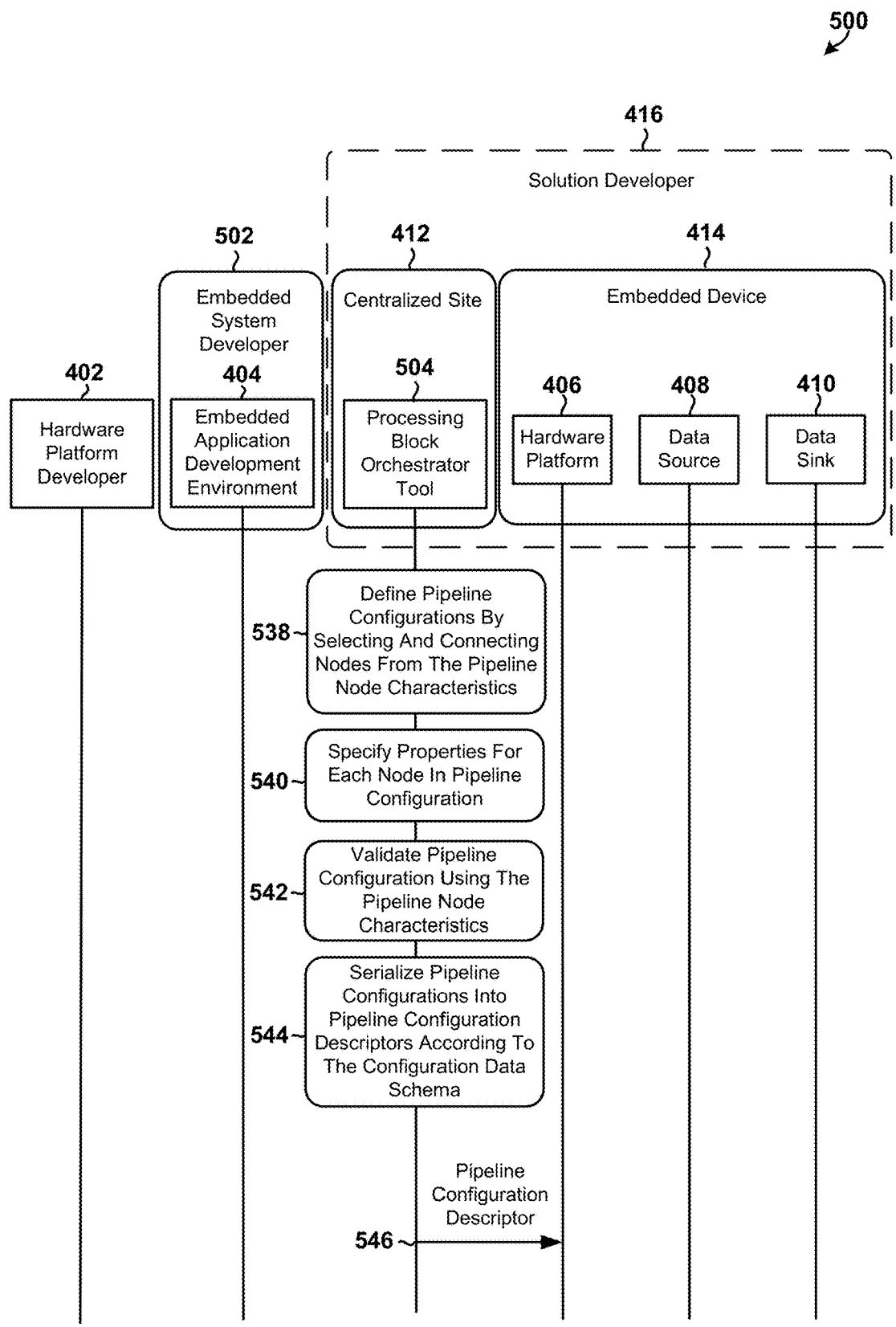

With reference to FIG. 5D, in operation 538, the solution developer 416 may use the processing block orchestrator tool 504 to define one or more pipeline configurations for each embedded application that is required to run on the embedded device 414. If more than one hardware platform 406 is available, then the solution developer 416 may choose the desired hardware platform 406 from a list presented by the tool (e.g., from a graphical drop-down list). The processing block orchestrator tool 504 enables the solution developer 416 to select from any nodes that are described in the pipeline node characteristics. A graphical drag-and-drop interface may be employed within the processing block orchestrator tool 504 to improve its usability. The solution developer 416 may choose the desired nodes from lists presented by the processing block orchestrator tool 504 (these lists may be generated based upon the pipeline node characteristics) and connect them together in the desired order to form a processing pipeline. The connections may be drawn graphically. In an embodiment, each pipeline configuration may be represented as one or more directed acyclic graphs (DAGs).

In operation 540, the solution developer 416 may specify properties for each node in the pipeline configuration (each node in each processing pipeline). The fields for each node may be managed by the processing block orchestrator tool 504 based on the pipeline node characteristics. This management may include the prevention of out-of-bounds or invalid parameter entry by the embedded system developer 502.

In operation 542, the solution developer 416 may validate the pipeline configuration using the pipeline node characteristics. That is, once the solution developer 416 indicates that the processing pipeline is complete, the processing block orchestrator tool 504 may traverse the pipeline configuration in order to validate it. It may do this by verifying the architecture of the processing pipeline, and verifying that each connection between nodes is valid, according to the pipeline node characteristics. Any invalid connections or settings may be indicated to the solution developer 416 by the processing block orchestrator tool 504. The validation step may be repeated if the solution developer 416 updates any invalid node field settings. This process may be repeated until all connections and steps in the pipeline configuration are deemed valid by the processing block orchestrator tool 504.

In operation 544, the solution developer 416 may serialize the validated pipeline configurations into pipeline configuration descriptors according to the configuration data schema by the processing block orchestrator tool 504. This process may convert the pipeline configuration information (e.g., nodes, connections, runtime operational parameters) into a file (e.g., a binary encoded file) according to the configuration data schema.

In operation 546, the pipeline configuration descriptor may be deployed to the embedded device 414 (e.g., transferred or loaded to its non-volatile or volatile memory, a connected memory, etc.) while the embedded application that is deployed on the hardware platform 406 in the embedded device 414 continues to operate/execute.

Figure 5E:
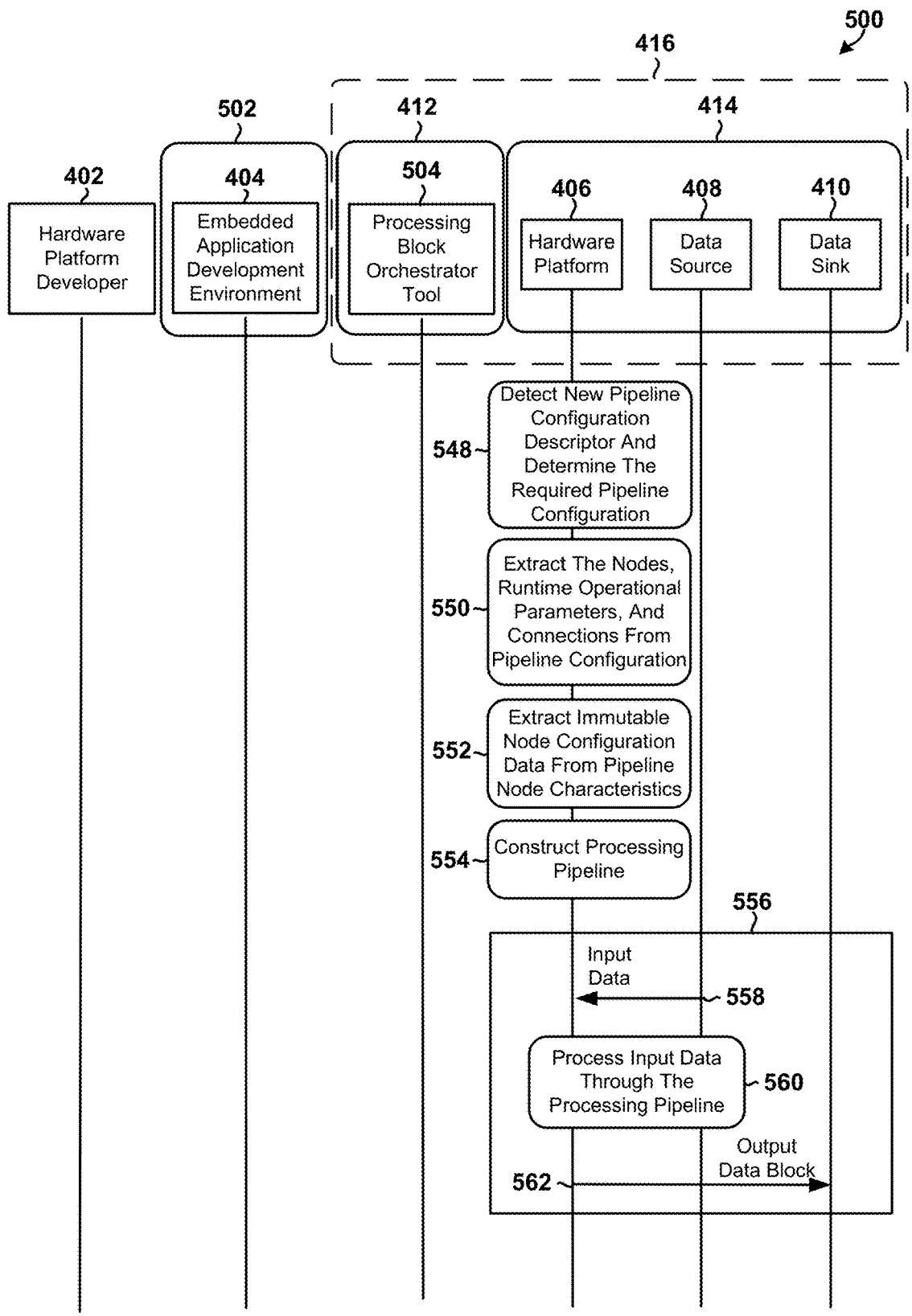

With reference to FIG. 5E, in operation 548, the dynamic pipeline engine runtime of the hardware platform 406 may detect that a new pipeline configuration descriptor has been deployed. In response, the dynamic pipeline engine may initiate a recursive descent algorithm that iterates over the pipeline configuration descriptor in order to determine the required pipeline configuration.

In operation 550, the hardware platform 406 (or the recursive descent algorithm) may use the configuration data schema and the pipeline node characteristics to extract the nodes, runtime operational parameters, and connections from pipeline configuration.

In operation 552, the dynamic pipeline engine runtime of the hardware platform 406 may extract immutable node configuration data from the pipeline node characteristics.

In operation 554, the dynamic pipeline engine runtime of the hardware platform 406 may construct a new or updated processing pipeline based on the configuration from operations 548-552, and via a backtracking algorithm that traverses backwards through the pipeline configuration to determine the connections at every node in the processing pipeline.

In operation 556, the hardware platform 406 may receive input data, process the received data through the constructed processing pipeline, and output data. For example, in operation 558, the embedded application within the hardware platform 406 may receive one or more blocks of input data. As an example, the input data may include a frame from a sensor, or several frames from several sensors that are simultaneously ingested and processed by the pipeline. In operation 560, the embedded application on the hardware platform 406 may process the input data through the constructed processing pipeline. In operation 562, the hardware platform 406 may output the processed block of data to the data sink 410, where it may, for example, be further processed by the embedded device 414, stored, returned to the host, or directly actioned upon. One such further processing step on the embedded device 414 may be applying it to the input of a neural network to perform inference. In some embodiments, the data sink 410 may be the embedded device 414 itself.

Operations 548-554 may be repeated as long as there is input data available for processing. In an embodiment, the input data may be passed as a pointer to a memory location, and the processed output data may be returned to a second memory location indexed by a pointer.

Operations 538-554 may occur prior to the embedded device 414 being deployed or after the embedded device 414 has been deployed.

Figure 5F:
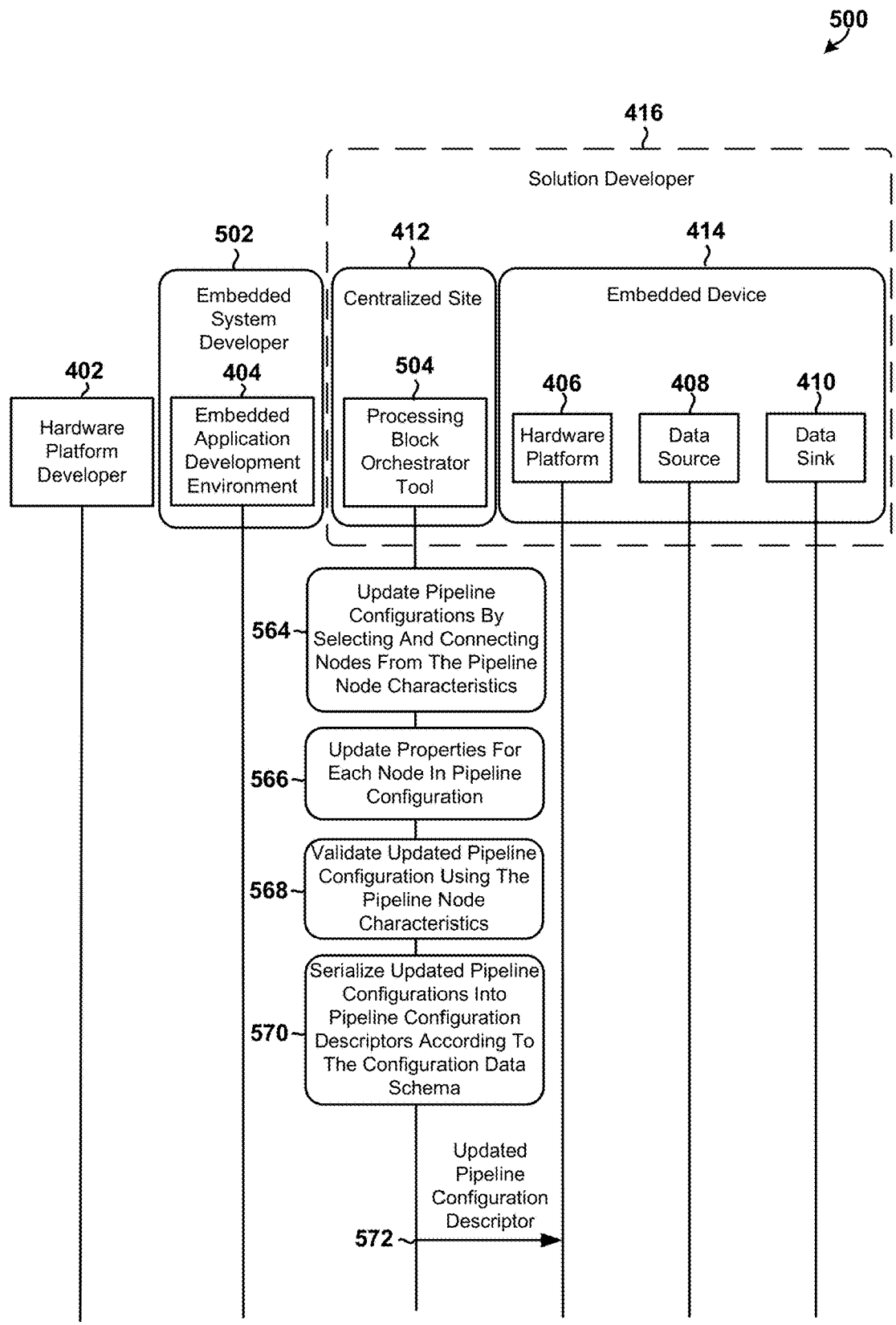
Figure 5G:
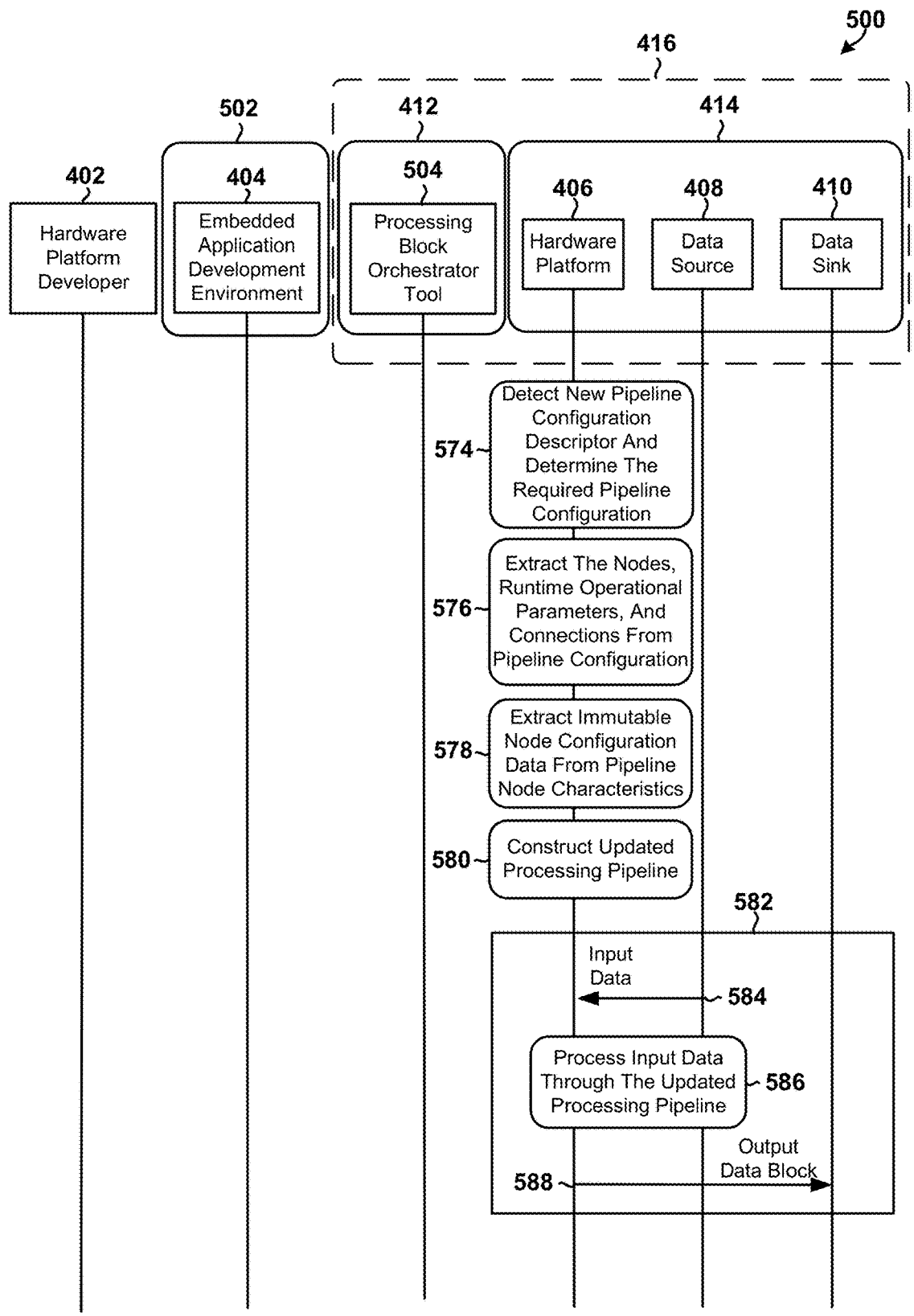

FIGS. 5F and 5G illustrate how the solution developer 416 may update or change a processing pipeline after the embedded device 414 has been deployed without having to modify or compile any source code, and without having to update and deploy the embedded application. These changes may occur at any time during the embedded device 414's operational life.

With reference to FIG. 5F, in operation 564, the solution developer 416 may update one or more pipeline configurations using the processing block orchestrator tool 504. The processing block orchestrator tool 504 may load the initial pipeline configurations from an external source (e.g., a file system, a version control system). The solution developer 416 may alternatively or additionally update the node properties in operation 566.

Once the solution developer 416 indicates that the updates to the processing pipeline are complete, the processing block orchestrator tool 504 may, in operation 568, traverse the pipeline configuration in order to validate it.

In operation 570, the processing block orchestrator tool 504 may serialize updated pipeline configurations into pipeline configuration descriptors according to the configuration data schema.

In operation 572, the pipeline configuration descriptor may be deployed to the embedded device 414. This pipeline configuration descriptor is significantly smaller than the embedded application, so it is faster and cheaper to transfer it to the embedded device 414. For example, the pipeline configuration descriptor may be 50 Bytes, whereas the equivalent embedded application may be hundreds of megabytes. In an embodiment, the pipeline configuration descriptor may contain only the changes from the previous version of the pipeline configuration descriptor in order to further reduce its size.

With reference to FIG. 5G, in operation 574, the dynamic pipeline engine runtime of the hardware platform 406 may detect a new or updated pipeline configuration descriptor and determine the required pipeline configuration. In operation 576, the recursive descent algorithm of the hardware platform 406 may use the configuration data schema and the pipeline node characteristics to extract the nodes, runtime operational parameters, and connections from the updated pipeline configuration. In operation 575, the dynamic pipeline engine runtime of the hardware platform 406 may extract immutable node configuration data from the pipeline node characteristics. In operation 580, the dynamic pipeline engine runtime of the hardware platform 406 may construct the new or updated processing pipeline. In an embodiment, the dynamic pipeline engine runtime may not start using the updated pipeline configuration until it has completed any active or pending tasks on the data being processed using the older pipeline configuration.

In operation 582, the hardware platform 406 may receive input data, process the received data through the constructed processing pipeline, and output data. For example, in operation 584, the embedded application within the hardware platform 406 may receive a block of input data. In operation 586, the embedded application on the hardware platform 406 may process the input data through the updated processing pipeline. In operation 588, the hardware platform 406 may output the processed block of data to the data sink 410. Operations 584-588 may be repeated as long as there is input data available for processing.

For every new pipeline configuration descriptor that is received by the dynamic pipeline engine runtime, operations 574-582 may be repeated. If a new pipeline configuration descriptor is received by the dynamic pipeline engine runtime, then any existing constructed processing pipelines may be automatically terminated, and the new processing pipeline may be constructed and executed.

Figure 6:
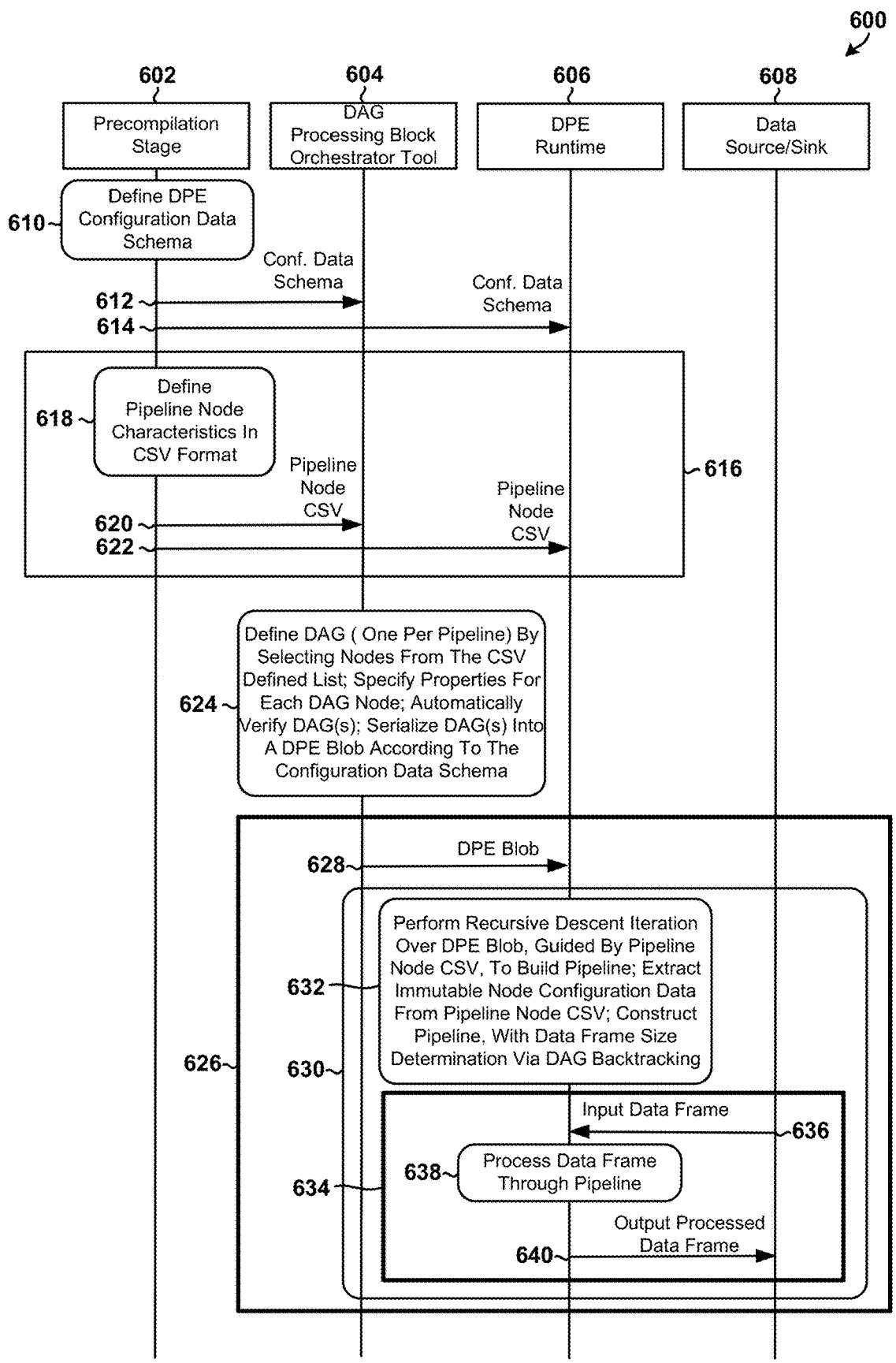
FIG. 6 is an activity diagram illustrating a method of designing and deploying one or more data processing pipelines on an embedded system without requiring the application running on the embedded system to be halted in accordance with some embodiments.

FIG. 6 illustrates further another method 600 of designing and deploying one or more data processing pipelines on an embedded device without requiring that the application running on the embedded device to be halted and replaced with a new embedded application. In the example illustrated in FIG. 6, method 600 is performed in a system that includes a precompilation stage 602 component, a directed acyclic graph (DAG) processing block orchestrator tool 604, a dynamic pipeline engine (DPE) runtime 606, and a data source/sink 608 component.

In some embodiments, any or all of the precompilation stage 602 component, DAG processing block orchestrator tool 604, DPE runtime 606 and data source/sink 608 component may be, or may be included in, the embedded system developer 502, centralized site 412, and embedded device 414. For example, the DAG processing block orchestrator tool 604 may be the processing block orchestrator tool 504 discussed above with reference to FIGS. 5A-5G. Similarly, the DPE runtime 606 may be the dynamic pipeline engine runtime of the hardware platform 406 discussed above with reference to FIGS. 5A-5G.

In operation 610, the precompilation stage 602 component may define the DPE configuration data schema. This schema is shared with both the DAG processing block orchestrator tool 604 in operation 612 and with the DPE runtime 606 in operation 614.

For each embedded platform, the pipeline node characteristics may be defined in operation 618 using a representation such as the comma separated value (CSV) format. This CSV data captures the nodes supported by the embedded system, and a description of the possible runtime operational parameters for each node (e.g., a list of parameter names, which may be assigned with parameter values). The CSV data is shared with both the DAG processing block orchestrator tool 604 in operation 620 and with the DPE runtime 606 in operation 622. In an embodiment, the CSV file may be generated manually. It may use one row per node, with parameters specified in columns. Predefined symbols in the CSV may be used to indicate that a parameter for a particular node is user defined. Otherwise the parameters list, for example, minimum or maximum or fixed values for each parameter for each note. Parameters may be strings, such as the node name or hardware target.

In operation 624, the DAG processing block orchestrator tool 604 may define a DAG (one per pipeline) by selecting nodes from the CSV defined list, specify properties for each DAG node, automatically verify the DAG(s), and serialize the DAG(s) into a DPE blob (or pipeline configuration descriptor) according to the configuration data schema. In operation 628, the DAG processing block orchestrator tool 604 may send the DPE blob (or pipeline configuration descriptor) to the DPE runtime 606.

In operation 632, the DPE runtime 606 may detect the new pipeline configuration descriptor that has been deployed. In response, the DPE runtime 606 may initiate a recursive descent algorithm that iterates over the pipeline configuration descriptor in order to determine the required pipeline configuration. The recursive descent algorithm may use the configuration data schema and the pipeline node characteristics CSV to extract the nodes, runtime operational parameters, characteristics, and connections of the DAG.

Also in operation 632, the DPE runtime 606 may extract immutable node configuration data from pipeline node CSV, and construct the processing pipeline with data frame size determination via DAG backtracking.

For every frame received by the DPE runtime 606 from the data source/sink 608 in operation 636, the frame is processed through the constructed pipeline in operation 638. The input frame may be passed as a pointer to a memory location, and the processed output frame may be returned to a second memory location indexed by a pointer. The processed frame may be sent to the data source/sink 608 in operation 640, where it may, for example, be further processed by the embedded device 414, stored, returned to the host, or directly actioned upon. One such further processing step on the embedded device 414 may be applying it to the input of a neural network to perform inference.

In an alternative embodiment, the pipeline configuration descriptor could have been represented using another format (e.g., tab separated values, JSON, XML). In some embodiments, the overheads of processing XML may be too high for the nature of the embedded applications intended for the dynamic pipeline engine, and the encoding of the data in XML form is also not dense enough to achieve the small size desired for the pipeline configuration (i.e., it is too verbose).

In an embodiment, the pipeline configuration descriptor may use a slightly enhanced variant of the Backus-Naur Form (BNF), which is commonly used to describe structured grammars for compilers. It is a useful and succinct form for describing the structure of the data present in the pipeline configuration descriptor.

The processing block orchestrator tool transforms the graphical representation of the processing pipelines as constructed by the user into pipeline configurations, and then into the pipeline configuration descriptor to be transferred to the dynamic pipeline engine runtime in accordance with this BNF schema.

In an embodiment, the representation of the description of the characteristics and properties of each of the nodes (i.e., the pipeline node characteristics) that are combined to form the processing pipelines may be critical. These may be organized in a tabular form containing many columns that describe the essential properties of the nodes, such as how many inputs and outputs they have (e.g., the number of bytes in a pixel, the width of an image).

This tabular form may be stored as a CSV file that may be easily edited using any text editor or spreadsheet programs, maintained using any version control system, and compiled directly into the dynamic pipeline engine sources to construct the actual runtime processing pipelines, and also by the processing block orchestrator tool to configure, connect, and validate the nodes in the pipelines. Some of these columns may only be used by the dynamic pipeline engine runtime, some of the columns may be used by both the dynamic pipeline engine runtime and the processing block orchestrator tool, and some of the columns may only be used by the processing block orchestrator tool (e.g., information that may be used by "tool tips").

When a characteristic of the node is fixed (for instance, it always has two inputs) then the corresponding column represents this absolute known data about the node, and this information is not encoded within the pipeline configuration descriptor since it is immutable.

When a characteristic of the node is variable (e.g., the image frame size), then this is represented in the pipeline node characteristics by a code which instructs the processing block orchestrator tool to request the information from the user (e.g., using the graphical user interface), and this user provided information is then encoded into the pipeline configuration file in accordance with the BNF described schema.

In an embodiment, the pipeline node characteristics file (e.g., a CSV file) may be used directly as compiled along with C/C++ source code (i.e., it is not interpreted). In an embodiment, the first field of the CSV may contain a macro. And the macro is defined in the source code. When the CSV is referenced in the source code (e.g., # included) the macro is auto-executed. It may also be used to drive the encoding of the pipeline configuration descriptor (by the processing block orchestrator tool) and the decoding of the pipeline configuration descriptor (by the dynamic pipeline engine runtime) to ensure as sparse an encoding as possible.

In an embodiment, the processing block orchestrator tool may enable users to build processing pipeline descriptions and configurations that may be interpreted by the dynamic pipeline engine runtime. The processing block orchestrator tool is the only part of the system that needs to be directly exposed to the end user (i.e., the solution developer 416). For maximum usability, it may utilize a drag-and-drop tool that facilitates the graphical construction of a processing pipeline, by the addition and arrangement of nodes, and the configuration of runtime operational parameters for each node. The user may select the required nodes from a list that is driven by the pipeline node characteristics (e.g., a CSV file), and define the dependencies between these nodes (e.g., filters) as the connections in the pipeline configuration. It may allow for arbitrary (valid) combinations of nodes. The node runtime operational parameters may be entered in the processing block orchestrator tool on a node-by-node basis. Once the processing pipeline is complete, a set of internal validity tests are run. These validity tests are driven by a series of rules contained in the pipeline node characteristics. Valid pipeline configurations are compiled into one or more pipeline configuration descriptors, which may be serialized according to the configuration data schema.

In an embodiment, the processing block orchestrator tool may allow the solution developer (e.g., solution developer 416 illustrated in FIGS. 5A-5G) to set criteria that must be true for the pipeline configuration as a whole. The processing block orchestrator tool may then ensure that the pipeline configuration criteria are satisfied as more nodes are added to the pipeline configuration and their runtime operational characteristics are configured and/or when existing nodes are modified. If the solution developer attempts to do something that would cause the pipeline configuration criteria not to be satisfied, then the tool may warn the solution developer or simply not allow the action to complete.

As an example, consider an embedded device that needs to process video data at a rate of 30 frames per second. The solution developer may set a pipeline configuration criteria that specifies that the pipeline must be able to process each frame with a latency of 1/30 of a second or less (i.e., approximately 33 milliseconds). The processing block orchestrator tool will then maintain a total processing time count as nodes are added to the processing pipeline within the processing block orchestrator tool. The processing block orchestrator tool may obtain the processing time associated with each node from information in the pipeline node characteristics. The processing block orchestrator tool may need to calculate the processing time associated with each node using a combination of information from the pipeline node characteristics and the runtime operation characters that have been set by the solution developer in the processing block orchestrator tool (e.g., the time taken to denoise an image frame may vary depending upon the frame size set by the solution developer). Referring again to the image processing pipeline shown in FIG. 2A, if the "Denoise", "Black level subtraction", and "Rescaler" nodes each take 5 milliseconds to execute, and the "Bad pixel correction" and "Debayer" nodes each take 10 milliseconds to execute, then the processing block orchestrator tool would not allow this pipeline configuration (i.e., 5+5+10+10+5=35, which is greater than the 33 milliseconds available). Another example is the setting of a pipeline configuration criteria around resource usage, such as memory usage (e.g., RAM usage). As nodes are added to the pipeline and their parameters configured, the processing block orchestrator tool may determine the approximate memory usage of the entire pipeline, and flag to the solution developer when the memory usage exceeds the resource usage criteria set by the solution developer.

In an embodiment, the processing block orchestrator tool may suggest a different hardware platform to the solution developer if the current hardware platform cannot satisfy the pipeline configuration criteria (e.g., a newer version of the same hardware platform).

In other embodiments, the solution developer may be able to set pipeline configuration criteria relating to other properties of the hardware platform (e.g., energy consumption, heat production).

The compiled pipeline configuration descriptors may contain the following information: the processing pipeline(s) to be built; the set of nodes that will make up each of the processing pipelines to be built; the links between these nodes that determine the order in which the nodes are to be applied (the processing pipeline); and the configuration runtime operational parameters for each node in the pipeline. In an embodiment, one or more valid pipelines may be included in the same pipeline configuration descriptor.

The dynamic pipeline engine runtime is the component that resides on the embedded device, and which uses the third-party proprietary device technology to actually build and run the processing pipelines. The implementation of this is done in three phases: (1) the configuration processing phase; (2) the processing pipeline construction phase; (3) and the processing pipeline execution phase.

In the configuration processing phase, the dynamic pipeline engine runtime is given a new pipeline configuration descriptor which is resident in memory, and the dynamic pipeline engine runtime executes a recursive descent iteration over the information in the pipeline configuration descriptor, building a set of meta-data that describes the organization and properties of the processing pipeline(s).

The pipeline node characteristics described earlier may be used to coordinate this iteration in order to extract the data describing each node in the processing pipeline, the runtime operational parameters required to construct each node, and the characteristics of the node. When a characteristic is immutable, then the value required is the one stated in the pipeline node characteristics entry for that node, but if the value required is variable, then it is extracted from the provided pipeline configuration descriptor.

Within the pipeline configuration descriptor there is also a description of the pipeline configuration that describes how the nodes in each of the processing pipelines are connected together, and during this phase of execution of the dynamic pipeline engine runtime, that information is captured and stored as metadata to be used later.

Following the completion of the configuration processing phase, the dynamic pipeline engine runtime now contains all of the metadata necessary for the construction of the processing pipelines.

The configuration processing phase is run each time the embedded application receives a new pipeline configuration descriptor.

Up to this point, the information and description of the processing pipeline is essentially independent of the hardware platform 406 that will be used to implement the processing pipeline. In the pipeline construction phase however, the dynamic pipeline engine runtime engages directly with the actual target hardware platform 406 to construct the processing pipeline, and to configure how the nodes in the processing pipeline are connected using the proprietary API exposed by the hardware platform 406.

There is some interaction between this phase and the metadata from the configuration processing phase. The majority of nodes (e.g., filters) in a processing pipeline accept a data frame of a particular frame size, and produce an output frame of the same frame size. To reduce the space in the pipeline configuration descriptor necessary to describe the processing pipelines, only nodes which have the "Resize" characteristic set in the pipeline node characteristics may encode a new output frame size, and in all other cases the input frame size to a node may be inferred from the output frame size of the predecessor node in the processing pipeline. However, it is not until the processing pipeline is being constructed that it is possible to determine the frame sizes, so the dynamic pipeline engine runtime may use a backtracking algorithm (e.g., a backtracking DAG iterator) to explore all paths along the processing pipeline starting from the final output node, and working back towards the input node, establishing the actual frame size information for each of the intermediate nodes along the way.

Once this process has completed, the processing pipelines are ready to accept input data.

This phase may be run exactly once after a new pipeline configuration descriptor has being processed. Alternatively, if a new pipeline configuration consists of just internal node parameter changes/updates that do not impact on the order of the notes in the processing pipeline or the frame dimensions, then a new pipeline configuration may be applied to an existing processing pipeline without requiring the destruction of the old processing pipeline and the construction of a new processing pipeline.

In the processing pipeline execution phase, the processing pipelines may then be run as many times as is desired once they have been constructed, with each pipeline being given just the location in memory of the data to be processed, and another location in memory where the result of the processing pipeline is to be stored.

In an embodiment, the interface that the embedded system developer uses may be kept as simple as possible, with nothing of the underlying implementation visible to the consumer of the dynamic pipeline engine runtime.

The dynamic pipeline engine implementation is a fully "compiled and optimized" implementation, and does not require any Just-In-Time (JIT) infrastructure. At all times the dynamic pipeline engine implementation may be directly engaged with the third-party hardware platform, and it is just as efficient (and possibly more efficient) as hand-written optimized code written for the same hardware platform. This is a significant differentiation, as it means that there is no runtime cost to the construction and execution of the processing pipelines imposed by the dynamic pipeline engine versus hand-tuned written and optimized code.

It is also important to note that a JIT based solution requires that the embedded device is connected to the computer that performs the JIT services, and requires a large amount of runtime support on the embedded device itself. In the satellite deployment scenario, for example, it is simply not possible to use a JIT based solution.

JIT based solutions also require the exchange of large amounts of data between the JIT PC environment and the JIT dynamic services on the embedded device. The optimization is also poor, and there are a lot of losses due to the infrastructure that would have significant impact on the high data-rate requirements of applications of the type that this system targets.

Figure 7:
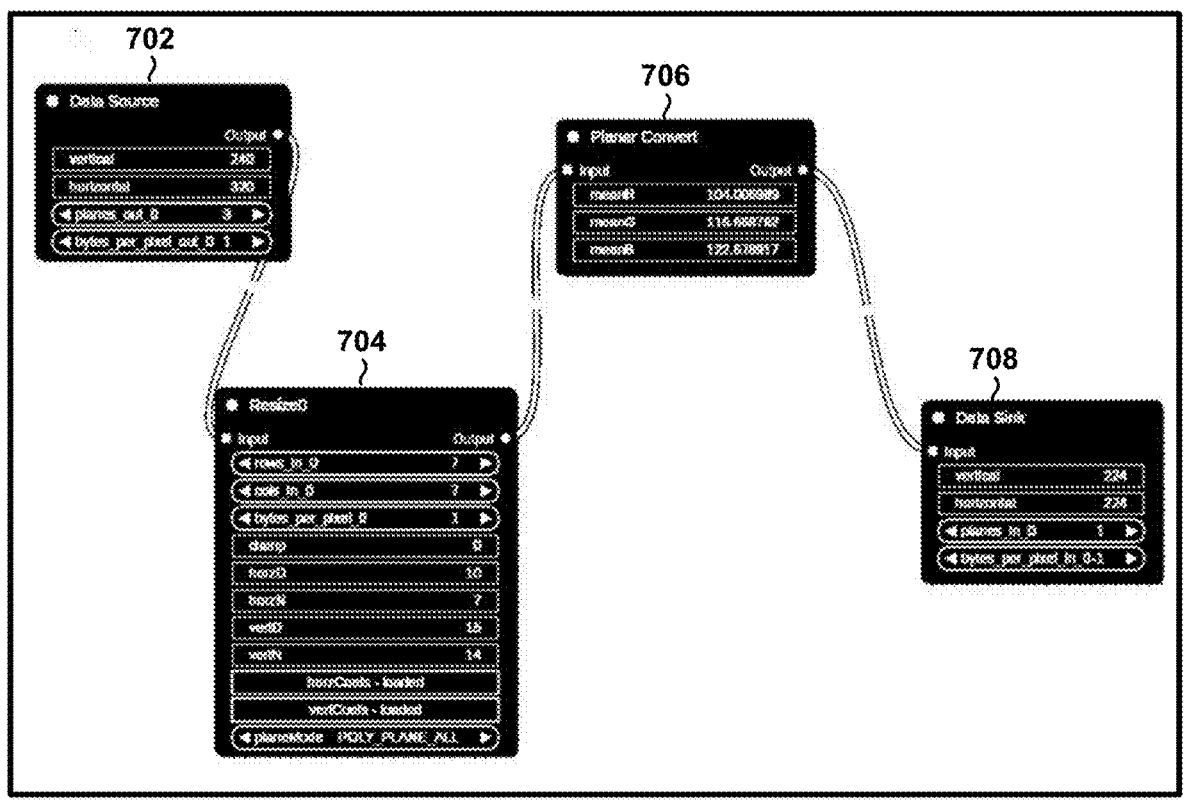
FIG. 7 is an illustration of the graphical user interface of a dynamic pipeline engine (DPE) directed acyclic graph (DAG) processing block orchestrator tool suitable for use in some embodiments.

FIG. 7 illustrates an example embodiment of the dynamic pipeline engine processing block orchestrator tool graphical interface. The processing block orchestrator tool is displaying a processing pipeline suitable for processing image data. It consists of a data source 702, two intermediate nodes 704, 706, and a data sink 708. The data source 702 may produce image frames that have a width of 320 pixels and a height of 240 pixels. The resizing node (intermediate node 704) may resize the image frame according to the runtime operational parameters specified within it. The planer convert node (intermediate node 706) may adjust the red, green, and blue channels according to the runtime operational parameters specified within it. Finally, the data sink 708 node may store or transmit the image frame for further processing outside of the processing pipeline (e.g., for classification by a neural network). The pipeline configuration may be saved externally, and subsequently loaded again in the future. The external representation of the pipeline may be in a text based file that makes it suitable for storing in a version control system. The processing block orchestrator tool may show the hardware platform (or target) for which the pipeline is being developed. Finally, the processing block orchestrator tool may enable the user to validate the pipeline configuration (which is done using the configuration data schema and the pipeline node characteristics) and serialize it into a pipeline configuration descriptor that is suitable for deploying to the hardware platform. This deployment would typically be done in a way that is specific to the hardware platform and the edge device in which it is deployed. Feedback may be provided to the user via a text window or console (not illustrated in FIG. 7). For example, if the validation fails, the cause of the failure is specified in a dialog window. Further, for invalid node connections, the relevant connection may be highlighted in the pipeline using a different color to that of the correct connections. New nodes may be added to the pipeline by right clicking on the canvas and choosing the node from a nested popup window, or by right clicking on the canvas and typing a node name into the search box.

Figure 8:
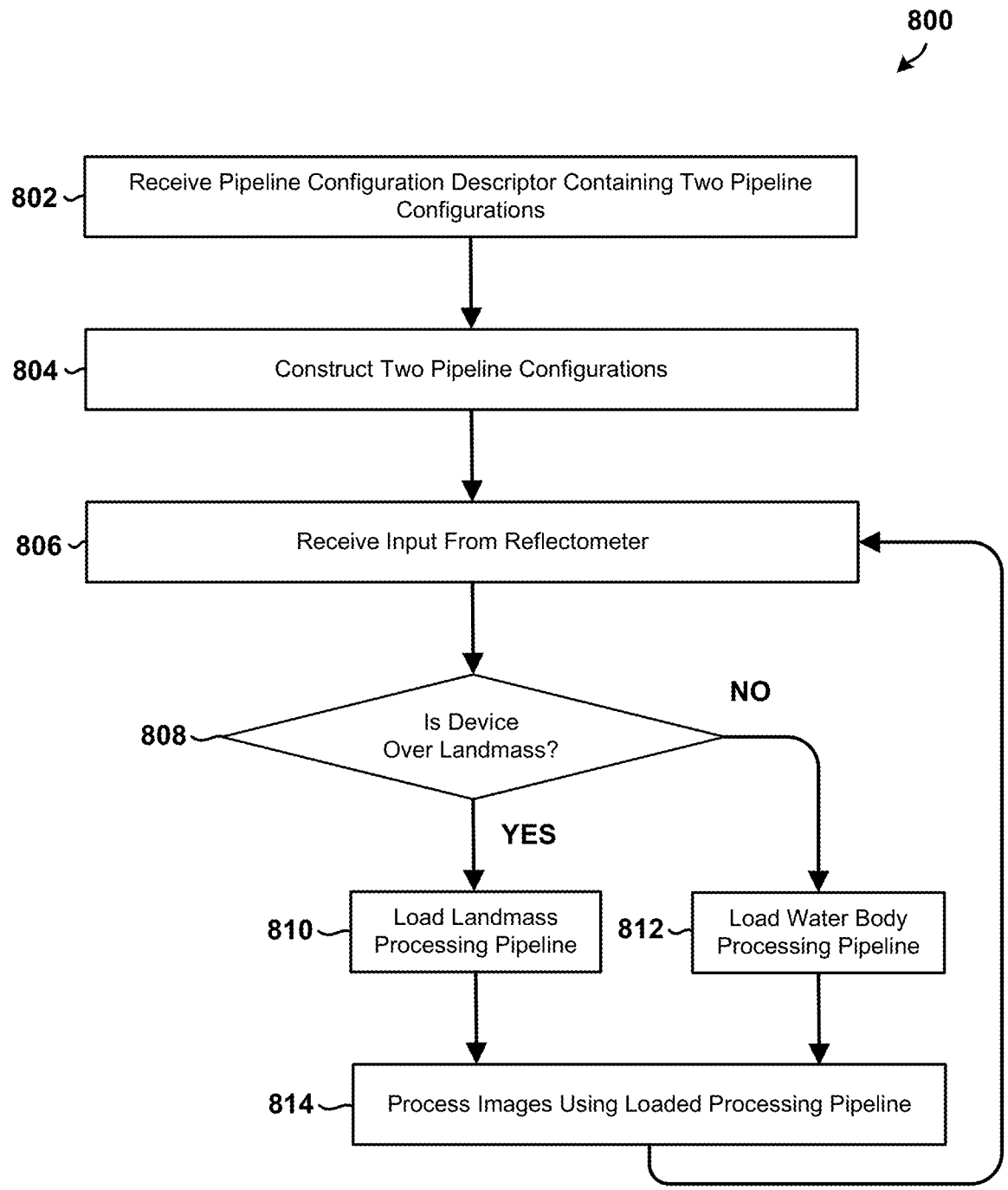
FIG. 8 is a process flow diagram illustrating a method of using a dynamic pipeline to process images in accordance with some embodiments.

As already mentioned, the dynamic pipeline engine runtime has the ability to alter the operations of a processing pipeline based on input from a sensor within the embedded device, without ever requiring any pause to, or alteration or compilation of, the embedded application. FIG. 8 illustrates a method 800 in which the previously described image processing pipeline that performs signal processing on images from an earth observation sensor onboard a satellite may be dynamically replaced based upon input from a reflectometer. Both the landmass processing pipeline and the water processing pipeline have been constructed and are available for execution on a particular input images. When the reflectometer measurement indicates low reflectance below some defined threshold, then all input images from the sensor to the embedded device are processed through the landmass processing pipeline. However, if the measurement from the reflectometer exceeds the defined threshold, then the processing logic specifies that the water processing pipeline should be executed on the input images. Since the reflectometer may be interfaced to a device other than the embedded device executing the processing pipelines, and the control logic may be implemented on that device, then the ability to dynamically swap processing pipelines may be managed without ever developing application-specific embedded source code for the embedded device.

In particular, in block 802, a processor in an embedded device (e.g., edge devices 110 illustrated in FIGS. 1A-1B, embedded device 414 illustrated in FIGS. 5A-5G, etc.) may receive a pipeline configuration descriptor containing two pipeline configurations. In block 804, the processor may construct two pipeline configurations. In block 806, the processor may receive input from a reflectometer. In block 808, the processor may determine whether the device (satellite) is over a landmass using the input from the reflectometer. In response to determining that the device is over a landmass (i.e., determination block 808="YES"), the processor may select, load or execute a landmass processing pipeline in block 810. In response to determining that the device is not over a landmass (i.e., determination block 808="NO"), the processor may select, load or execute a water body processing pipeline in block 812. In block 814, the processor may process images using selected/loaded processing pipeline. The processor may repeat the operations in block 806-814 periodically or upon receiving additional input from the reflectometer.

Thus, FIG. 8 illustrates that an entire pipeline may be swapped at runtime. Multiple pipelines may be resident on the device at a time, and on a per-frame basis the appropriate pipeline to apply to that frame, from the set of resident ones, may be selected. The selection may be controlled by anything external to the embedded device itself (since if it was controlled by the embedded device then that control and reconfiguration could have been compiled into the application in the first place). Thus, a user could specify the pipeline under direct control, or a CPU could specify the pipeline, or a microcontroller processing other sensor information could specify the pipeline, or a position/navigation unit could specify the pipeline (e.g., one pipeline when over desert, one over water, based on the known satellite location), etc.

In addition, brand new PCDs (pipeline configuration description files) may be uploaded at runtime in order to enable post-deployment updates to the operation of the embedded device, and to enable the 'swapping' of pipelines when there is not sufficient space to enable all pipelines to be resident on the device at the same time.

Figure 9A:
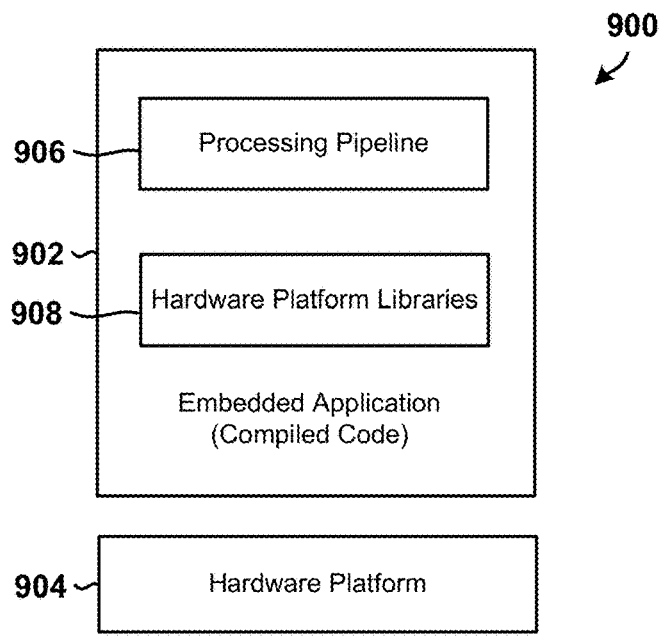
FIGS. 9A and 9B are component block diagrams illustrating components in embedded devices that could be configured in accordance with the embodiments.

FIG. 9A illustrates a conventional embedded device 900, which typically includes an embedded application 902 and a hardware platform 904. The embedded application 902 may include a processing pipeline 906 and hardware platform libraries 908.

Figure 9B:
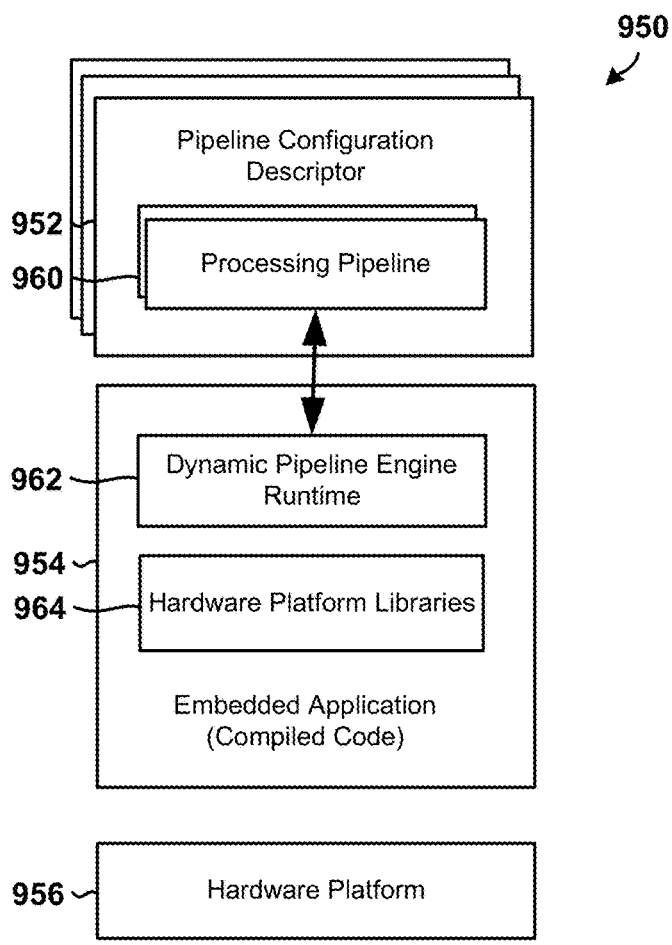

FIG. 9B illustrates an embedded device 950 that may be configured to allow parameter tuning post-deployment by the end-user/owner in accordance with the embodiments. In the example illustrated in FIG. 9B, the embedded device 950 includes one or more pipeline configuration descriptors 952, embedded application 954, and a hardware platform 956. Each pipeline configuration descriptor 952 may include one or more processing pipelines 960. The embedded application 954 may include a dynamic pipeline engine runtime 962 and hardware platform libraries 964.

Figure 10A:
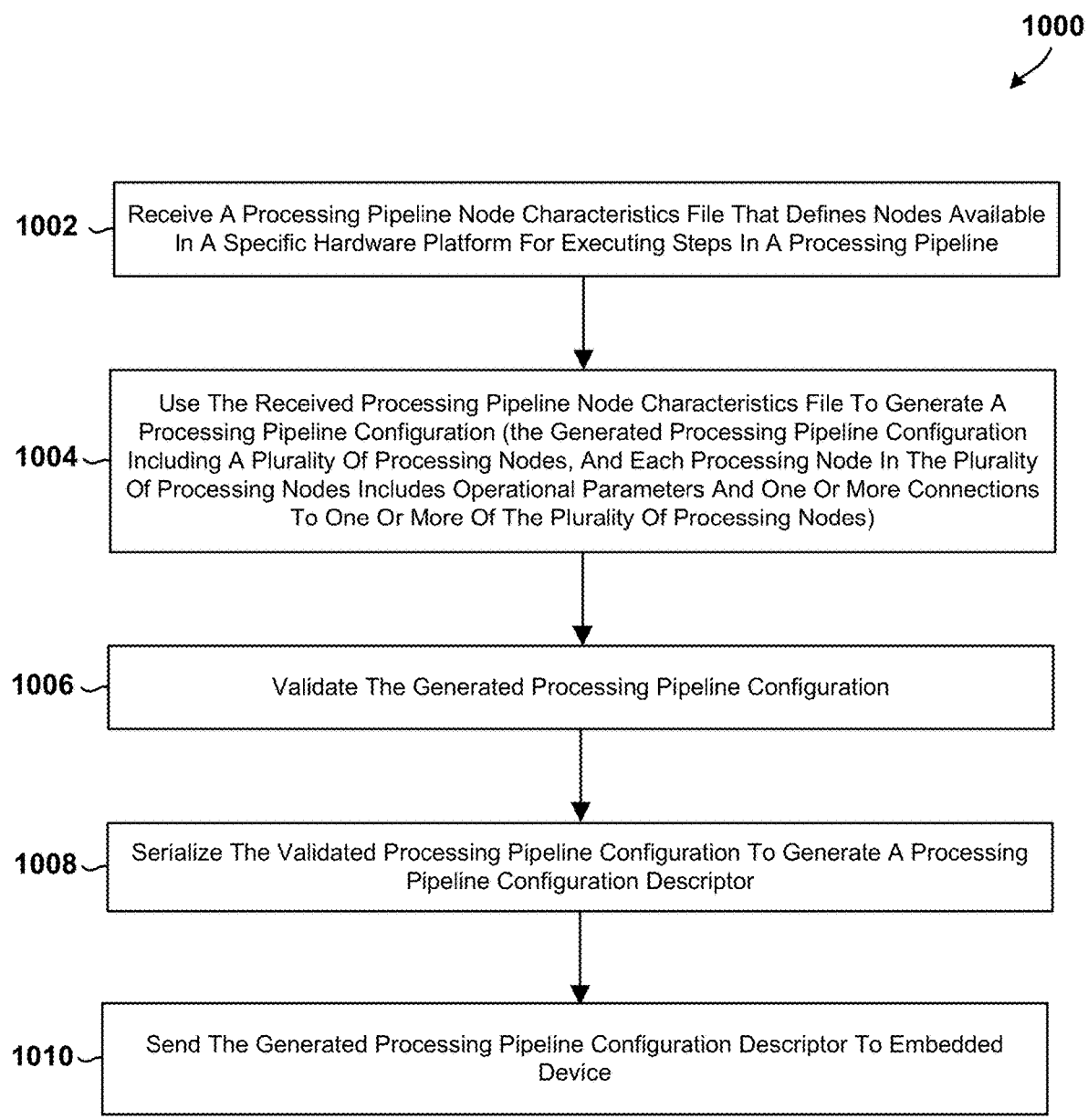
FIG. 10A is a process flow diagram illustrating a method for a computing device at a centralized site to dynamically configure processing pipelines in software-controlled hardware-software embedded systems in accordance with some embodiments.

FIG. 10A illustrates a method 1000 of dynamically configuring processing pipelines in software-controlled hardware-software embedded systems in accordance with the embodiments. All or portions of method 1000 may be performed by a processor in a computing system deployed at a centralized site (e.g., centralized site/device 120, 412, etc.).

In block 1002, the processor may receive a processing pipeline node characteristics file that defines nodes available in a specific hardware platform for executing steps in a processing pipeline. In some embodiments, receiving the pipeline node characteristics file in block 1002 may include receiving a comma separated value (CSV) delimited file containing data representing the processing nodes supported by an embedded system and parameter descriptions for each processing node.

In block 1004, the processor may use the received processing pipeline node characteristics file to generate a processing pipeline configuration. The generated processing pipeline configuration may include a plurality of processing nodes. Each processing node in the plurality of processing nodes may include operational parameters and one or more connections to one or more of the plurality of processing nodes. In block 1006, the processor may validate the generated processing pipeline configuration. In block 1008, the processor may serialize the validated processing pipeline configuration to generate a processing pipeline configuration descriptor.

In block 1010, the processor may send the generated processing pipeline configuration descriptor to embedded device. Sending the generated processing pipeline configuration descriptor to the embedded device may cause the embedded device to modify the operations of one or more nodes in a local processing pipeline of the embedded device and/or cause the embedded device to modify its local processing pipeline while continuing to process the data.

Figure 10B:
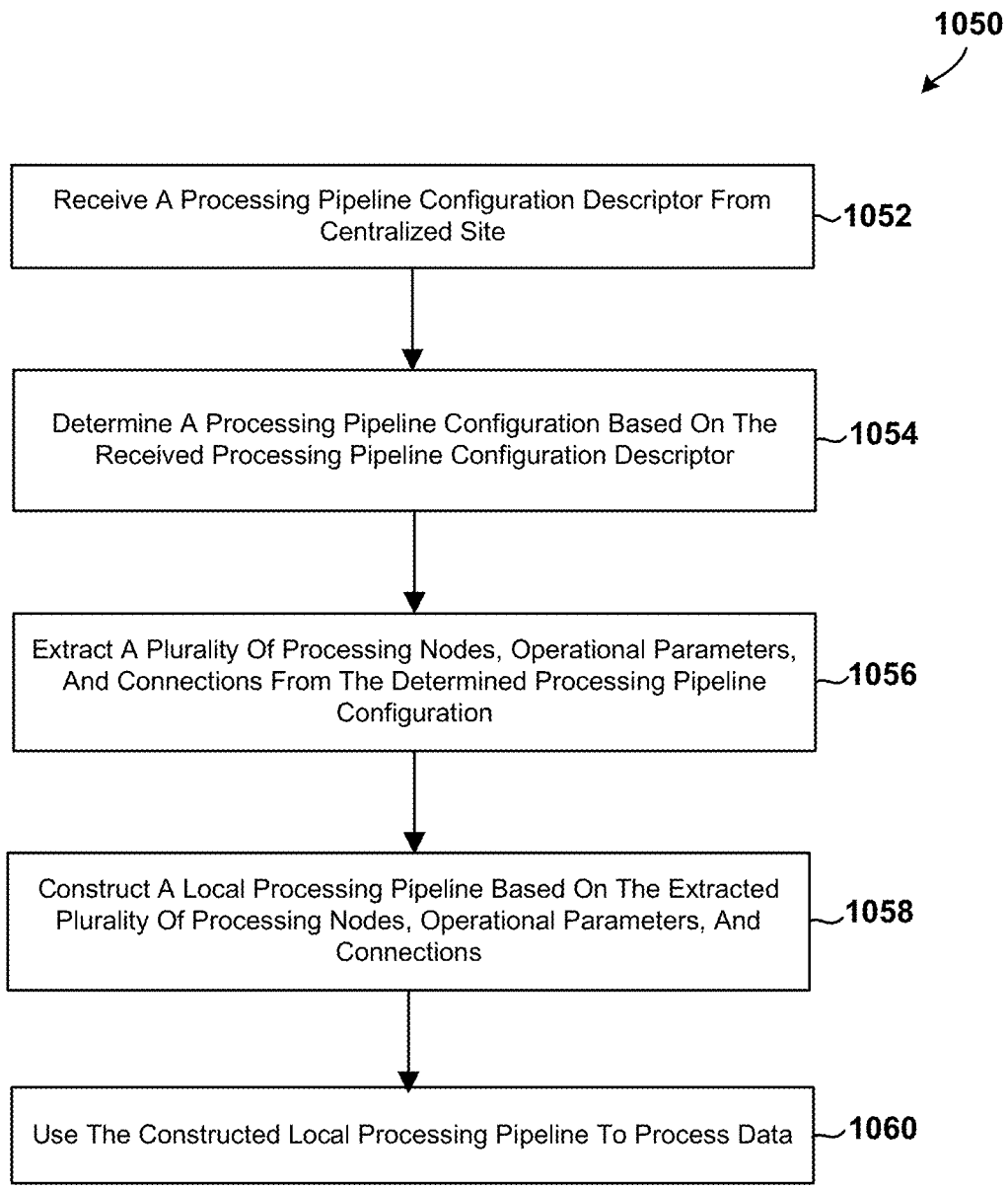
FIG. 10B is a process flow diagram illustrating a method for an embedded device to dynamically configure processing pipelines in software-controlled hardware-software embedded systems in accordance with some embodiments.

FIG. 10B illustrates a method 1050 of dynamically configuring processing pipelines in software-controlled hardware-software embedded systems in accordance with the embodiments. All or portions of method 1050 may be performed by a processor in an embedded device (e.g., edge devices 110a, 110b, embedded device 414, etc.).

In block 1052, the embedded device processor may receive a processing pipeline configuration descriptor from centralized site. In block 1054, the embedded device processor may determine a processing pipeline configuration based on the received processing pipeline configuration descriptor. In block 1056, the embedded device processor may extract a plurality of processing nodes, operational parameters, and connections from the determined processing pipeline configuration. In block 1058, the embedded device processor may construct a local processing pipeline based on the extracted plurality of processing nodes, operational parameters, and connections. In block 1060, the embedded device processor may use the constructed local processing pipeline to process data. For example, the embedded device processor may use the constructed local processing pipeline to process at least one or more of an input image frame, an input audio frame, an input radar frame, or an input hyperspectral data cube.

Figure 11:
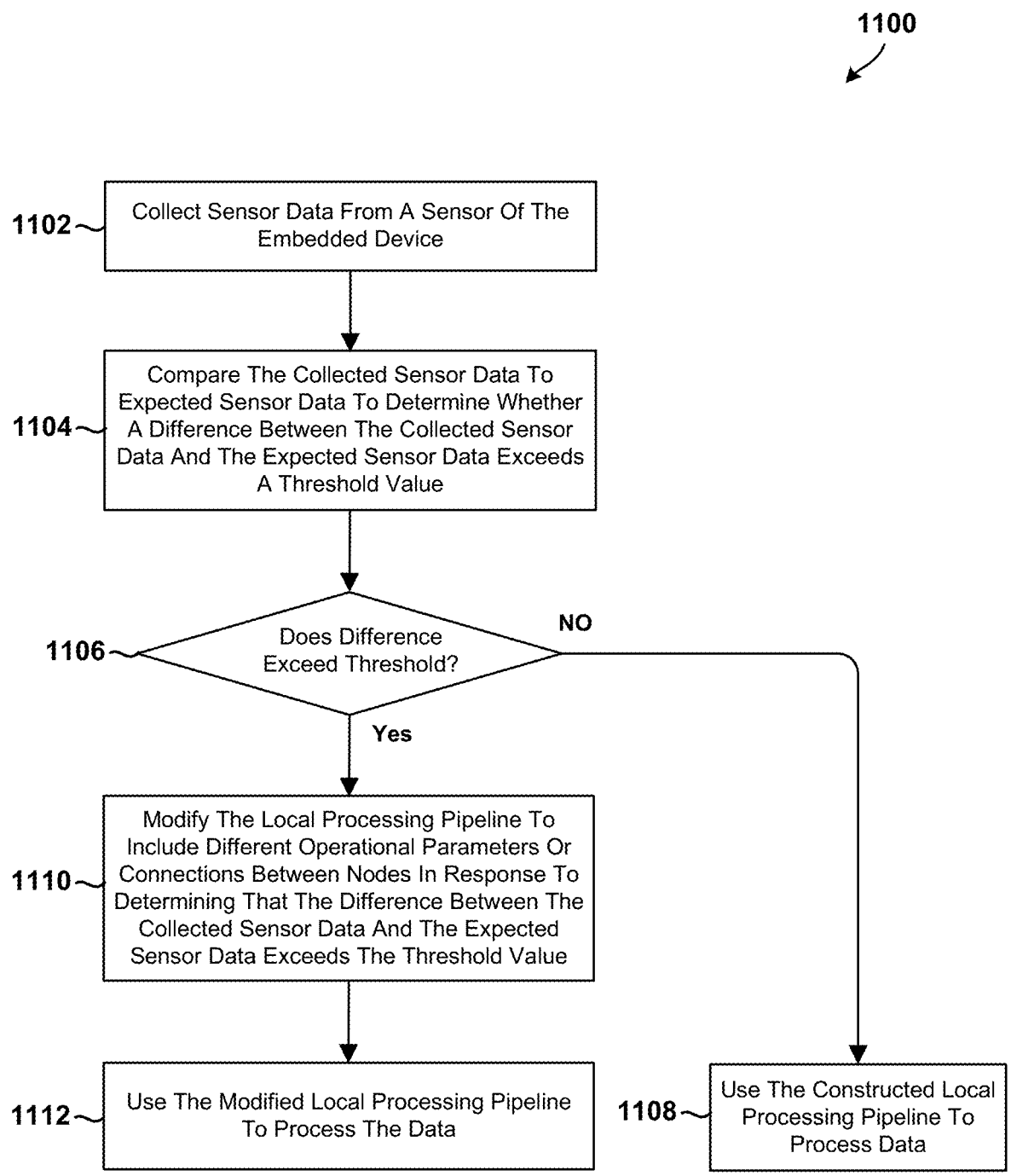
FIG. 11 is a process flow diagram illustrating a method for an embedded device to dynamically update its processing pipelines in accordance with some embodiments.

FIG. 11 illustrates a method 1100 of dynamically updating the local processing pipelines in accordance with some embodiments. All or portions of method 1100 may be performed by a processor in an embedded device (e.g., edge devices 110a, 110b, embedded device 414, etc.). In some embodiments, method 1100 may be performed after any or all of the operations illustrated and described with reference FIGS. 10A and 10B.

In block 1102, the embedded device processor may collect sensor data from a sensor of the embedded device. In block 1104, the embedded device processor may compare the collected sensor data to expected sensor data to determine whether a difference between the collected sensor data and the expected sensor data exceeds a threshold value.

In determination block 1106, the embedded device processor may determine whether the difference between the collected sensor data and the expected sensor data exceeds the threshold value. In response to determining that the difference between the collected sensor data and the expected sensor data does not exceed the threshold value (i.e., determination block 1106="NO"), the embedded device processor may use a previously constructed local processing pipeline (e.g., the pipeline constructed in block 1058, etc.) to process data in block 1108.

In response to determining that the difference between the collected sensor data and the expected sensor data exceeds the threshold value (i.e., determination block 1106="YES"), in block 1110 the embedded device processor may modify the local processing pipeline to include different operational parameters or connections between nodes in response to determining that the difference between the collected sensor data and the expected sensor data exceeds the threshold value. In block 1112, the embedded device processor may use the modified local processing pipeline to process the data.

Figure 12:
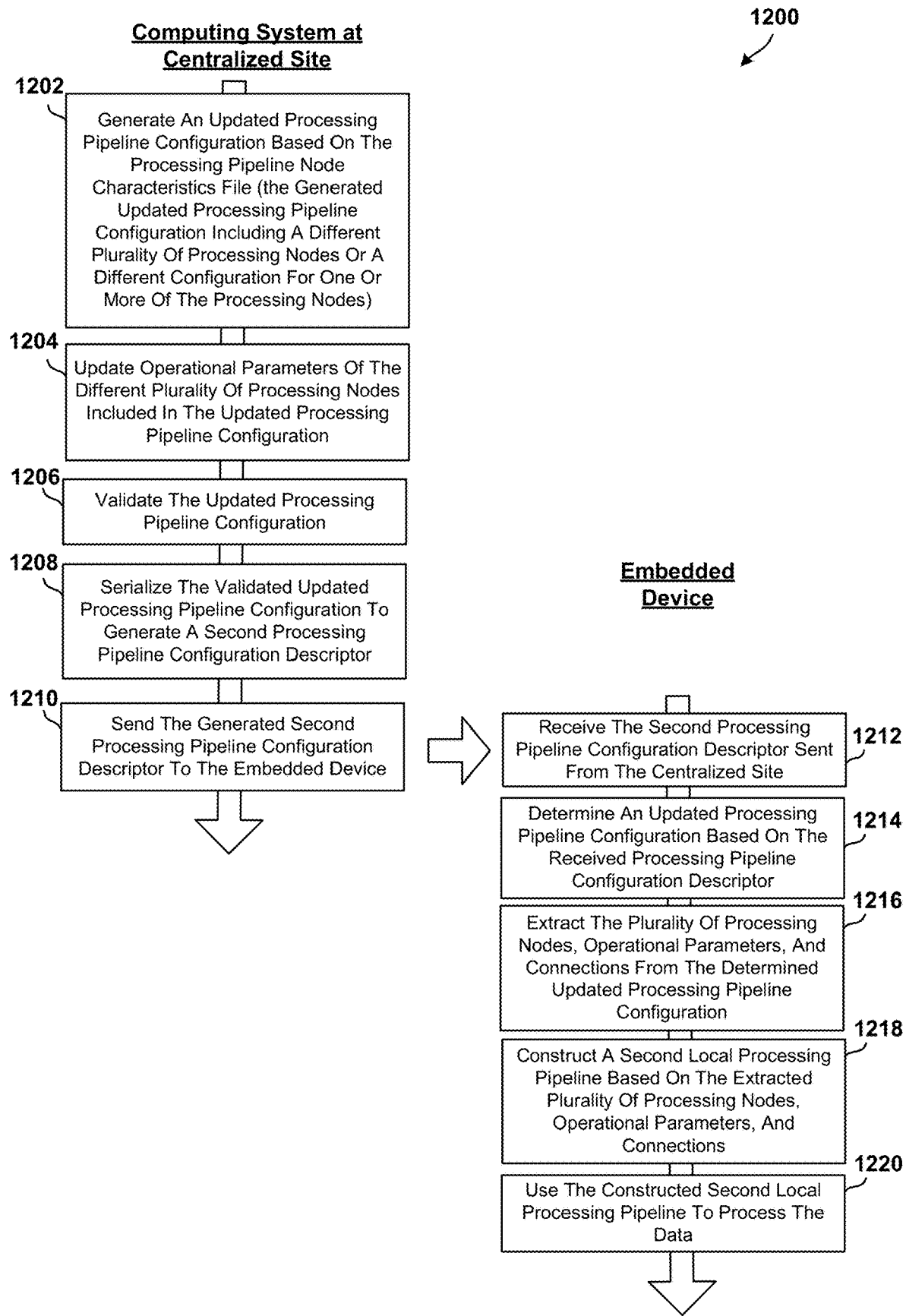
FIG. 12 is a process flow diagram illustrating a method for dynamically reconfiguring processing pipelines in software-controlled hardware-software embedded systems in accordance with some embodiments.

FIG. 12 illustrates a method 1200 dynamically configuring processing pipelines in software-controlled hardware-software embedded systems in accordance with the embodiments. All or portions of method 1200 may be performed by a processor in a computing system deployed at a centralized site (e.g., centralized site/device 120, 412, etc.) and/or a processor in an embedded device (e.g., edge devices 110a, 110b, embedded device 414, etc.). In some embodiments, method 1200 may be performed after any or all of the operations illustrated and described with reference FIG. 10A, 10B, or 11.

In block 1202, the processor at the centralized site may generate an updated processing pipeline configuration based on the processing pipeline node characteristics file. The generated updated processing pipeline configuration may include a different plurality of processing nodes or a different configuration for one or more of the processing nodes. In block 1204, the processor at the centralized site may update operational parameters of the different plurality of processing nodes included in the updated processing pipeline configuration. In block 1206, the processor at the centralized site may validate the updated processing pipeline configuration. In block 1208, the processor at the centralized site may serialize the validated updated processing pipeline configuration to generate a second processing pipeline configuration descriptor. In block 1210, the processor at the centralized site may send the generated second processing pipeline configuration descriptor to the embedded device.

In block 1212, the embedded device processor may receive the second processing pipeline configuration descriptor sent from the centralized site. In block 1214, the embedded device processor may determine an updated processing pipeline configuration based on the received processing pipeline configuration descriptor. In block 1216, the embedded device processor may extract the plurality of processing nodes, operational parameters, and connections from the determined updated processing pipeline configuration. In block 1218, the embedded device processor may construct a second local processing pipeline based on the extracted plurality of processing nodes, operational parameters, and connections. In block 1220, the embedded device processor may use the constructed second local processing pipeline to process the data. For example, the embedded device processor may use the constructed second local processing pipeline to repurpose the embedded device for a different purpose, task or mission.

Further embodiments may include a method of dynamically configuring processing pipelines in software-controlled hardware-software embedded systems. The method may include receiving, by a processor in an embedded device, a processing pipeline configuration descriptor from a centralized site, determining, by the processor, a processing pipeline configuration based on the received processing pipeline configuration descriptor, extracting, by the processor, a plurality of processing nodes, operational parameters, and connections from the determined processing pipeline configuration, constructing, by the processor, a local processing pipeline based on the extracted plurality of processing nodes, operational parameters, and connections, and using, by the processor, the constructed local processing pipeline to process data.

In some embodiments, using the constructed local processing pipeline to process the data may include using the constructed local processing pipeline to process at least one or more of an input image frame, an input audio frame, an input radar frame, or an input hyperspectral data cube.

In some embodiments, the method may further include collecting, by the processor, sensor data from a sensor of the embedded device, determining, by the processor, whether a difference between the collected sensor data and expected sensor data exceeds a threshold value, modifying, by the processor, the local processing pipeline to include different operational parameters or connections between nodes in response to determining that the difference between the collected sensor data and the expected sensor data exceeds the threshold value, and using, by the processor, the modified local processing pipeline to process the data.

In some embodiments, the method may further include receiving, by the processor, a second processing pipeline configuration descriptor sent from the centralized site, determining, by the processor, an updated processing pipeline configuration based on the received processing pipeline configuration descriptor, extracting, by the processor, the plurality of processing nodes, operational parameters, and connections from the determined updated processing pipeline configuration, constructing, by the processor, a second local processing pipeline based on the extracted plurality of processing nodes, operational parameters, and connections, and using, by the processor, the constructed second local processing pipeline to process the data.

In some embodiments, using the constructed second local processing pipeline to process the data includes repurposing the embedded device a different purpose, task or mission.

Further embodiments may include an embedded device that includes a processor configured with processor-executable software instructions to receive a processing pipeline configuration descriptor from a centralized site, determine a processing pipeline configuration based on the received processing pipeline configuration descriptor, extract a plurality of processing nodes, operational parameters, and connections from the determined processing pipeline configuration, construct a local processing pipeline based on the extracted plurality of processing nodes, operational parameters, and connections, and use the constructed local processing pipeline to process data.

In some embodiments, the processor may be configured with processor-executable software instructions such that using the constructed local processing pipeline to process the data includes using the constructed local processing pipeline to process at least one or more of an input image frame, an input audio frame, an input radar frame, or an input hyperspectral data cube.

In some embodiments, the processor may be further configured with processor-executable software instructions to collect sensor data from a sensor of the embedded device, determine whether a difference between the collected sensor data and expected sensor data exceeds a threshold value, modify the local processing pipeline to include different operational parameters or connections between nodes in response to determining that the difference between the collected sensor data and the expected sensor data exceeds the threshold value, and use the modified local processing pipeline to process the data.

In some embodiments, the processor may be further configured with processor-executable software instructions to receive a second processing pipeline configuration descriptor sent from the centralized site, determine an updated processing pipeline configuration based on the received processing pipeline configuration descriptor, extract the plurality of processing nodes, operational parameters, and connections from the determined updated processing pipeline configuration, construct a second local processing pipeline based on the extracted plurality of processing nodes, operational parameters, and connections, and use the constructed second local processing pipeline to process the data.

In some embodiments, the processor may be configured with processor-executable software instructions such that using the constructed second local processing pipeline to process the data includes repurposing the embedded device a different purpose, task or mission.

Further embodiments may include a non-transitory computer readable storage medium having stored thereon processor-executable software instructions configured to cause a processor in an embedded device to perform operations for dynamically configuring processing pipelines in software-controlled hardware-software embedded systems. The operations may include receiving a processing pipeline configuration descriptor from a centralized site, determining a processing pipeline configuration based on the received processing pipeline configuration descriptor, extracting a plurality of processing nodes, operational parameters, and connections from the determined processing pipeline configuration, constructing a local processing pipeline based on the extracted plurality of processing nodes, operational parameters, and connections, and using the constructed local processing pipeline to process data.

In some embodiments, the stored processor-executable software instructions may be configured to cause a processor to perform operations such that using the constructed local processing pipeline to process the data includes using the constructed local processing pipeline to process at least one or more of an input image frame, an input audio frame, an input radar frame, or an input hyperspectral data cube.

In some embodiments, the stored processor-executable software instructions may be further configured to cause a processor to perform operations that include collecting sensor data from a sensor of the embedded device, determining whether a difference between the collected sensor data and expected sensor data exceeds a threshold value, modifying the local processing pipeline to include different operational parameters or connections between nodes in response to determining that the difference between the collected sensor data and the expected sensor data exceeds the threshold value, and using the modified local processing pipeline to process the data.

In some embodiments, the stored processor-executable software instructions may be configured to cause a processor to perform operations that include receiving a second processing pipeline configuration descriptor sent from the centralized site, determining an updated processing pipeline configuration based on the received processing pipeline configuration descriptor, extracting the plurality of processing nodes, operational parameters, and connections from the determined updated processing pipeline configuration, constructing a second local processing pipeline based on the extracted plurality of processing nodes, operational parameters, and connections, and using the constructed second local processing pipeline to process the data.

In some embodiments, the stored processor-executable software instructions may be configured to cause a processor to perform operations such that using the constructed second local processing pipeline to process the data includes repurposing the embedded device a different purpose, task or mission.

Figure 13:
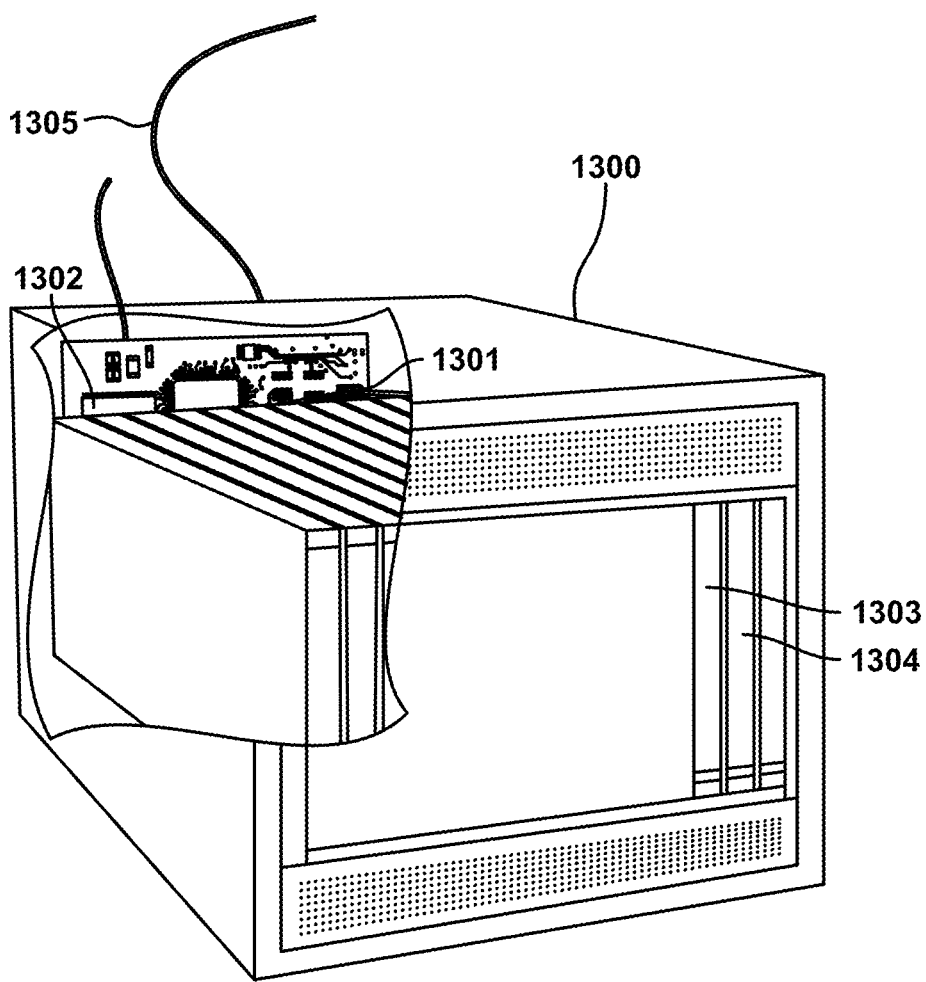
FIG. 13 is a component diagram of server computing device suitable for implementing some embodiments.

Some embodiments or components discussed in this application, such as the embedded system developer, centralized site, or embedded device, may be implemented on or make use of any of a variety of commercially available server devices, an example of which is illustrated in FIG. 13. In particular, FIG. 13 illustrates a server 1300 that includes a processor 1301 coupled to volatile memory 1302 and a large capacity nonvolatile memory, such as a disk drive 1303. The server 1300 may also include network access ports 1304 coupled to the processor 1301 for establishing data connections with a network 1305, such as a local area network coupled to other operator network computers and servers, and/or for communicating with edge devices.

The processor 1301 may be any programmable microprocessor, microcomputer or multiple processor chip or chips that may be configured by software instructions (applications) to perform a variety of functions, including the functions of the various embodiments described below. Multiple processors 1301 may be provided, such as one processor dedicated to wireless communication functions and one processor dedicated to running other applications. Typically, software applications may be stored in the internal memory 1302, 1303 before they are accessed and loaded into the processor 1301. The processor 1301 may include internal memory sufficient to store the application software instructions.

The foregoing method descriptions and the process flow diagrams are provided merely as illustrative examples and are not intended to require or imply that the operations of the various aspects must be performed in the order presented. As will be appreciated by one of skill in the art the order of steps in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of dynamically configuring processing pipelines in software-controlled hardware-software embedded systems, comprising:
    receiving, by a processor at a centralized site, a processing pipeline node characteristics file that defines nodes available in a specific hardware platform for executing steps in a processing pipeline;
    using, by the processor, the received processing pipeline node characteristics file to generate a processing pipeline configuration, wherein the generated processing pipeline configuration includes a plurality of processing nodes, and each processing node in the plurality of processing nodes includes operational parameters and one or more connections to one or more of the plurality of processing nodes;
    validating, by the processor, the generated processing pipeline configuration;
    serializing, by the processor, the validated processing pipeline configuration to generate a processing pipeline configuration descriptor; and
    sending, by the processor, the generated processing pipeline configuration descriptor to an embedded device.

2. The method of claim 1, further comprising:
    receiving, by the embedded device, the processing pipeline configuration descriptor sent from the centralized site;
    determining, by the embedded device, the processing pipeline configuration based on the received processing pipeline configuration descriptor;
    extracting, by the embedded device, the plurality of processing nodes, operational parameters, and connections from the determined processing pipeline configuration;
    constructing, by the embedded device, a local processing pipeline based on the extracted plurality of processing nodes, operational parameters, and connections; and
    using, by the embedded device, the constructed local processing pipeline to process data.

3. The method of claim 2, wherein using the constructed local processing pipeline to process the data comprises using the constructed local processing pipeline to process at least one or more of:
    an input image frame;
    an input audio frame;
    an input radar frame; or
    an input hyperspectral data cube.

4. The method of claim 2, further comprising:
    collecting, by the embedded device, sensor data from a sensor of the embedded device;
    determining, by the embedded device, whether a difference between the collected sensor data and expected sensor data exceeds a threshold value;
    modifying, by the embedded device, the local processing pipeline to include different operational parameters or connections between nodes in response to determining that the difference between the collected sensor data and the expected sensor data exceeds the threshold value; and
    using, by the embedded device, the modified local processing pipeline to process the data.

5. The method of claim 1, further comprising:
    generating, by the processor, an updated processing pipeline configuration based on the processing pipeline node characteristics file, wherein the generated updated processing pipeline configuration includes a different plurality of processing nodes or a different configuration for one or more of the processing nodes;
    updating, by the processor, operational parameters of the different plurality of processing nodes included in the updated processing pipeline configuration;
    validating, by the processor, the updated processing pipeline configuration;
    serializing, by the processor, the validated updated processing pipeline configuration to generate a second processing pipeline configuration descriptor; and
    sending, by the processor, the generated second processing pipeline configuration descriptor to the embedded device.

6. The method of claim 5, further comprising:
    receiving, by the embedded device, the second processing pipeline configuration descriptor sent from the centralized site;
    determining, by the embedded device, an updated processing pipeline configuration based on the received processing pipeline configuration descriptor;
    extracting, by the embedded device, the plurality of processing nodes, operational parameters, and connections from the determined updated processing pipeline configuration;
    constructing, by the embedded device, a second local processing pipeline based on the extracted plurality of processing nodes, operational parameters, and connections; and
    using, by the embedded device, the constructed second local processing pipeline to process the data.

7. The method of claim 6, wherein using the constructed second local processing pipeline to process the data comprises repurposing the embedded device for a different purpose, task or mission.

8. The method of claim 1, wherein sending the generated processing pipeline configuration descriptor to the embedded device causes the embedded device to modify operations of one or more nodes in a local processing pipeline of the embedded device.

9. The method of claim 1, wherein sending the generated processing pipeline configuration descriptor to the embedded device causes the embedded device to modify a local processing pipeline while continuing to process the data.

10. The method of claim 1, wherein receiving the pipeline node characteristics comprises receiving a comma separated value (CSV) delimited file containing data representing the processing nodes supported by an embedded system and parameter descriptions for each processing node.

11. A computing device, comprising:
a processor configured with processor-executable software instructions to:
receive a processing pipeline node characteristics file that defines nodes available in a specific hardware platform for executing steps in a processing pipeline;
use the received processing pipeline node characteristics file to generate a processing pipeline configuration, wherein the generated processing pipeline configuration includes a plurality of processing nodes, and each processing node in the plurality of processing nodes includes operational parameters and one or more connections to one or more of the plurality of processing nodes;
validate the generated processing pipeline configuration;
serialize the validated processing pipeline configuration to generate a processing pipeline configuration descriptor; and
send the generated processing pipeline configuration descriptor to an embedded device.

12. The computing device of claim 11, wherein the processor is further configured with processor-executable software instructions to:
generate an updated processing pipeline configuration based on the processing pipeline node characteristics file, wherein the generated updated processing pipeline configuration includes a different plurality of processing nodes or a different configuration for one or more of the processing nodes;
update operational parameters of the different plurality of processing nodes included in the updated processing pipeline configuration;
validate the updated processing pipeline configuration;
serialize the validated updated processing pipeline configuration to generate a second processing pipeline configuration descriptor; and
send the generated second processing pipeline configuration descriptor to the embedded device.

13. The computing device of claim 11, wherein the processor is configured with processor-executable software instructions so that sending the generated processing pipeline configuration descriptor to the embedded device causes the embedded device to modify operations of one or more nodes in a local processing pipeline of the embedded device.

14. The computing device of claim 11, wherein the processor is configured with processor-executable software instructions so that sending the generated processing pipeline configuration descriptor to the embedded device causes the embedded device to modify a local processing pipeline while continuing to process the data.

15. The computing device of claim 11, wherein the processor is configured with processor-executable software instructions to receive the pipeline node characteristics by receiving a comma separated value (CSV) delimited file containing data representing the processing nodes supported by an embedded system and parameter descriptions for each processing node.

16. A non-transitory computer readable storage medium having stored thereon processor-executable software instructions configured to cause a processor to perform operations for dynamically configuring processing pipelines in software-controlled hardware-software embedded systems, the operations comprising:
receiving a processing pipeline node characteristics file that defines nodes available in a specific hardware platform for executing steps in a processing pipeline;
using the received processing pipeline node characteristics file to generate a processing pipeline configuration, wherein the generated processing pipeline configuration includes a plurality of processing nodes, and each processing node in the plurality of processing nodes includes operational parameters and one or more connections to one or more of the plurality of processing nodes;
validating the generated processing pipeline configuration;
serializing the validated processing pipeline configuration to generate a processing pipeline configuration descriptor; and
sending the generated processing pipeline configuration descriptor to an embedded device.

17. The non-transitory computer readable storage medium of claim 16, wherein the stored processor-executable software instructions are configured to cause a processor to perform operations further comprising:
generating an updated processing pipeline configuration based on the processing pipeline node characteristics file, wherein the generated updated processing pipeline configuration includes a different plurality of processing nodes or a different configuration for one or more of the processing nodes;
updating operational parameters of the different plurality of processing nodes included in the updated processing pipeline configuration;
validating the updated processing pipeline configuration;
serializing the validated updated processing pipeline configuration to generate a second processing pipeline configuration descriptor; and
sending the generated second processing pipeline configuration descriptor to the embedded device.

18. The non-transitory computer readable storage medium of claim 16, wherein the stored processor-executable software instructions are configured to cause a processor to perform operations such that sending the generated processing pipeline configuration descriptor to the embedded device causes the embedded device to modify operations of one or more nodes in a local processing pipeline of the embedded device.

19. The non-transitory computer readable storage medium of claim 16, wherein the stored processor-executable software instructions are configured to cause a processor to perform operations such that sending the generated processing pipeline configuration descriptor to the embedded device causes the embedded device to modify a local processing pipeline while continuing to process the data.

20. The non-transitory computer readable storage medium of claim 16, wherein the stored processor-executable software instructions are configured to cause a processor to perform operations such that receiving the pipeline node characteristics comprises receiving a comma separated value (CSV) delimited file containing data representing the processing nodes supported by an embedded system and parameter descriptions for each processing node.

* * * * *